(12) United States Patent
Said et al.

(10) Patent No.: US 8,073,622 B2
(45) Date of Patent: Dec. 6, 2011

(54) LONG-RANGE LIGHTNING DETECTION AND CHARACTERIZATION SYSTEM AND METHOD

(75) Inventors: Ryan Khalil Said, Palo Alto, CA (US); Umran Savas Inan, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 681 days.

(21) Appl. No.: 12/152,232

(22) Filed: May 12, 2008

(65) Prior Publication Data

US 2009/0281730 A1    Nov. 12, 2009

(51) Int. Cl.
*G01W 1/00* (2006.01)
(52) U.S. Cl. ............ 702/4; 702/2; 702/3; 702/8; 702/16
(58) Field of Classification Search .................. 702/2–4, 702/8, 16
See application file for complete search history.

(56) References Cited

U.S. PATENT DOCUMENTS

| | | | | |
|---|---|---|---|---|
| 5,295,072 | A | * | 3/1994 | Stevens et al. ..................... 702/4 |
| 5,305,210 | A | * | 4/1994 | Kuzma et al. ..................... 702/4 |
| 5,325,299 | A | * | 6/1994 | Moses et al. ...................... 702/4 |
| 7,411,513 | B1 | | 8/2008 | Karamanian et al. |
| 2004/0204853 | A1 | * | 10/2004 | Devarasetty et al. ............. 702/3 |
| 2008/0262732 | A1 | | 10/2008 | Davis et al. |

OTHER PUBLICATIONS

Interim Guidelines for Bilski vs. Kappos 1.*
Interim Guidelines for Bilski vs. Kappos 2.*
WO 2004/086067 A, (Valsala OYJ), Oct. 7, 2004, cited in the application, the whole document.
Nickolaenko, A. P. et al, "Natural electromagnetic pulses in the ELF range", Geophydical Research Letters, American Geophysical Union, US, vol. 25, No. 16, Jan. 1, 1998, pp. 3103-3106, XP008111570, ISSN: 0094-8276, the whole document.
Cummer, S. A. et al: "Modeling ELF radio atmospheric propagation and extracting lightning currents from ELF observations", Radio Science, American Geophysical Union, Washington, DC, US, vol. 35, No. 2, Mar. 1, 2000, pp. 385-394, XP008111430, ISSN: 0048-6604, the whole document.
Nickolaenko, A. P.: "Spectra and waveforms of natural electromagnetic pulses in the ELF range", Electromagnetic Compatibility, Institute of Radio Physics and Electronics, Ukrainian National Academy of Sciences, 12 Acad, Proskury St., Kharkov 310085, Ukraine, Jan. 1, 1998, pp. 557-560, XP008111484, ISBN: 978-83-901999-6-2, the whole document.

(Continued)

*Primary Examiner* — Sujoy Kundu
(74) *Attorney, Agent, or Firm* — Portland Intellectual Property, LLC

(57) ABSTRACT

A long-range lightning detection and characterization system and method. Electromagnetic radiation produced by a lightning strike is sensed at a sensing location and a measured signal representative of the strike is produced that defines an amplitude versus time. A set of reference data containing waveforms comparable to the measured signal is established. The set of reference data defines a set of reference amplitudes versus time, representative of one or more predetermined reference lightning strikes at various predetermined distances, where for each of the distances, the reference lightning strikes have associated therewith various predetermined day/night percentages. The measured signal is compared with the reference data, the comparison including finding a correlation between the measured signal and a correlating waveform in the reference data. At least one of a propagation distance, a time-of-arrival, a polarity, and an amplitude of the measured signal is inferred by reference to the correlating waveform.

34 Claims, 12 Drawing Sheets

OTHER PUBLICATIONS

Rafalsky, V. A. et al: "Location of Lightning discharges from a single station", Journal of Geophysical Research, American Geophysical Union, US, vol. 100, No. D10, Oct. 20, 1995, pp. 20829-20838, XP008111596, ISSN: 0148-0227, the whole document.

Nagano, I. et al: Lightning Location with Single-Station Observation of VLF Spherics, EOS, American Geophysical Union, Washington DC, US, Dec. 1, 2001, p. F142, XP008111682, ISSN: 0096-3941, the whole document.

Taylor, W. L. et al: "ELF attenuation rates and phase velocities observed from slow-tail components of atmospherics", Radio Science, American Geophysical Union, Washington DC, US, vol. 5, No. 12. Dec. 1, 1970, pp. 1453-1460, XP008111579, ISSN: 0048-6604, the whole document.

Said, R. K., Inan, U.: "Lightning Geo-Location via Combined Use of Time of Arrival, Arrival Azimuth, and Atmospherics", Sao/Nasa ADS Physics Abstract Service, [online], Dec. 2006, XP008112008, Retrieved from the Internet: URL:http://adsabs.harvard.edu/abs/2006AGUFMAE33A10555>, [retrieved on Sep. 3, 2009], the whole document.

Harlin, J. D. et al: "Lightning VLF/LF waveforms at distances of hundreds to thousands of kilometers and their implications on lightning location systems", Sao/Nasa ADS Physics Abstract Service, [online], Dec. 2006, XP008111683, Retrieved from the Internet: URL:http://adsabs. harvard.edu/abs/2006AGUFMAE21A1000h., [retrieved on Sep. 3, 2009], the whole document.

Bor, J. et al: "Comparison of ELF transients observed at two separate observatories", Internet Article, [online], Oct. 6, 2006, XP002547090, Retrieved from the Internet: URL:http://web.archive.org/web/20061006131725//http://www.ursi.org/Proceedings/ProcGA05/pdf/HGEP.11(0080).pdf., [retrieved on Sep. 3, 2009], the whole document.

PCT International Search Report and Written Opinion of the International Searching Authority in International Application No. PCT/US2009/002896, mailed Dec. 23, 2009.

T.B. McDonald et al, "Lightning Location and Lower-Ionospheric Height Determination From Two-Station Magnetic Field Measurements", Journal of Geophysical Research, vol. 84, No. C-4, Apr. 20, 1979, pp. 1727-1734, ISSN 0148-0227.

V.S. Rafalsky et al, "One-site distance-finding technique for locating lightning discharges", Journal of Atmospheric and Terrestrial Physics, vol. 57, No. 11, pp. 1255-1261, 1995, ISSN 0021-9169.

K. Sao et al, "Real time location of atmospherics by single station techniques and preliminary results", Journal of Atmospheric and Terrestrial Physics, 1974, vol. 36, pp. 261-266.

B.F. Schonland et al, "The Wave Form of Atmospherics at Night", Proceedings of the Royal Society of London, Series A, Mathmatical and Physical Sciences, vol. 176, No. 965, Oct. 9, 1940, pp. 180-202.

D.T. Kemp, "The global location of large lightning discharges from single station oservations of ELF disturbances in the Earth-ionosphere cavity", Journal of Atmospheric and Terrestrial Physics, 1971, vol. 33, pp. 919-927.

D. Llanwyn Jones et al, "Experimental and theoretical observations on the transient excitation of Schmann resonances", Journal of Atmospheric and Terrestrial Physics, 1970, vol. 32, pp. 1095-1108.

S. Gopalakrrishna et al, "Study of daytime VLF spectra parameters of atmospherics as a function of azimuth", Inst. J Electronics, 1984, vol. 56, No. 3, pp. 330-348.

F. Horner, "The Accuracy of the Location of Sources of Atmospherics by Radio Direction-Finding", Digests of Papers, 621.396.933.2 : 621.396.821, Paper No. 1709, Radio Section, pp. 297-298.

P.G.F. Caton et al, "The Waveforms of Atmospherics", Ser. 7, vol. 43, No. 339, Apr. 1952, pp. 393-409.

C.P. Burke et al, "Global radiolocation in the lowoer ELF frequency band", Journal of Geophysical Research, vol. 100, No. D12, Dec. 20, 1995, pp. 26,263-26,271, ISSN 0148-0227.

\* cited by examiner

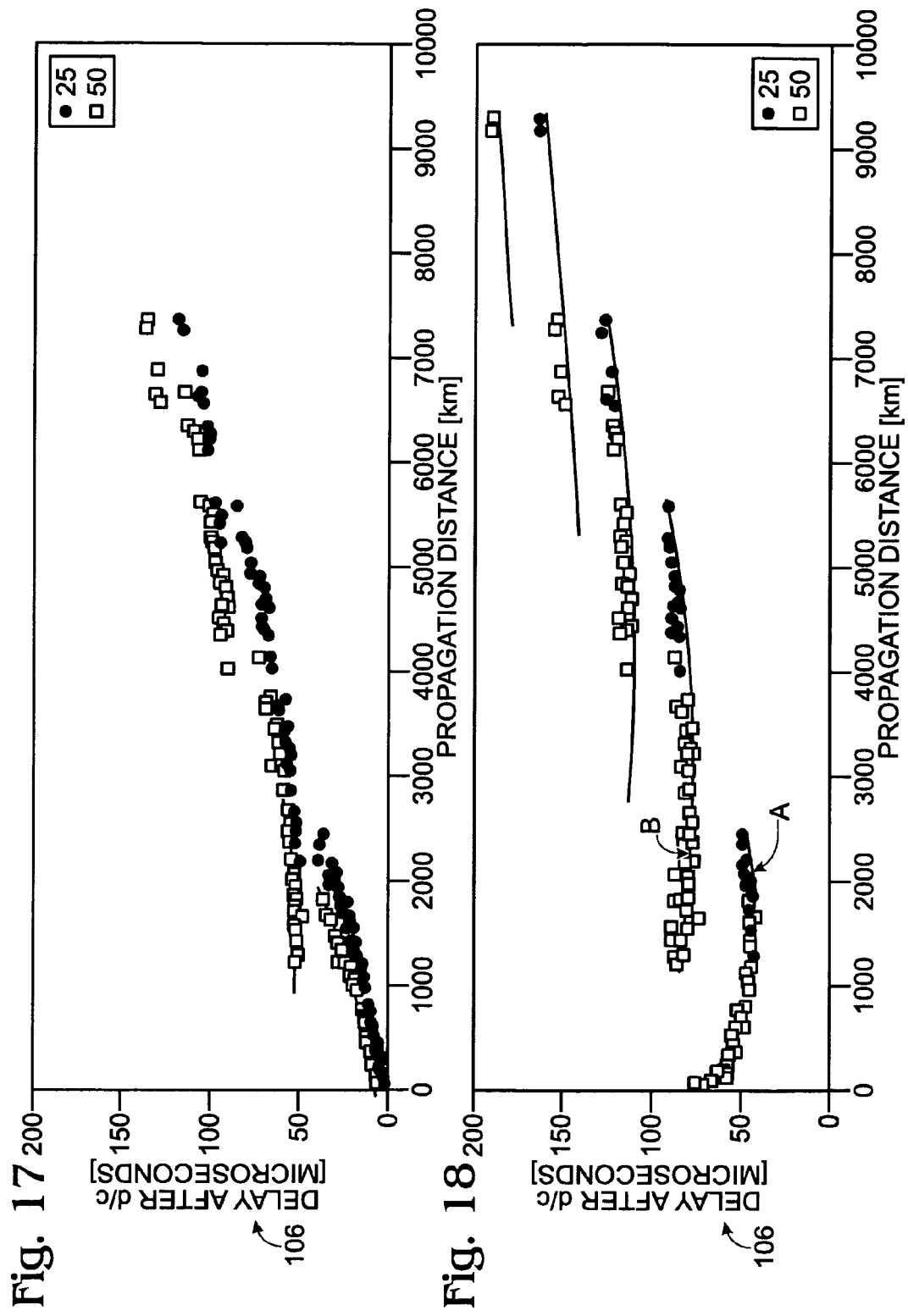

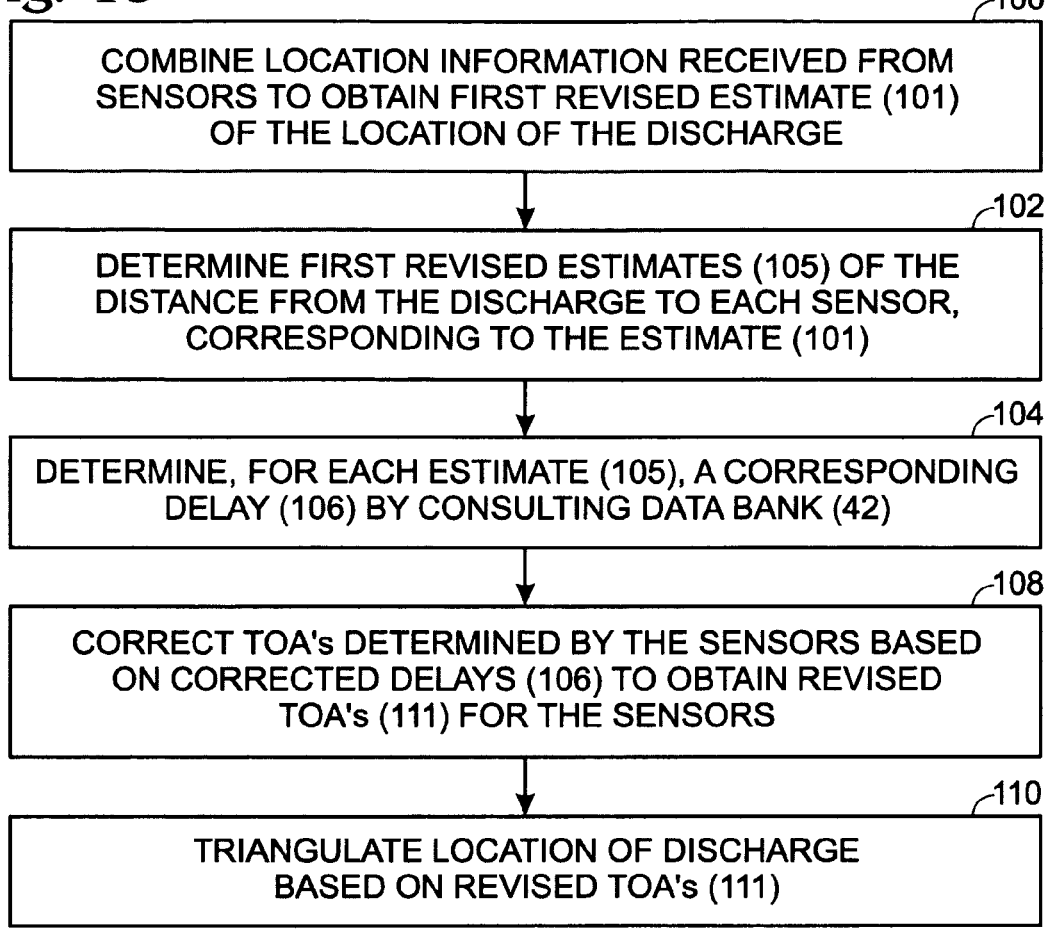

Fig. 19

- COMBINE LOCATION INFORMATION RECEIVED FROM SENSORS TO OBTAIN FIRST REVISED ESTIMATE (101) OF THE LOCATION OF THE DISCHARGE (100)
- DETERMINE FIRST REVISED ESTIMATES (105) OF THE DISTANCE FROM THE DISCHARGE TO EACH SENSOR, CORRESPONDING TO THE ESTIMATE (101) (102)
- DETERMINE, FOR EACH ESTIMATE (105), A CORRESPONDING DELAY (106) BY CONSULTING DATA BANK (42) (104)
- CORRECT TOA's DETERMINED BY THE SENSORS BASED ON CORRECTED DELAYS (106) TO OBTAIN REVISED TOA's (111) FOR THE SENSORS (108)
- TRIANGULATE LOCATION OF DISCHARGE BASED ON REVISED TOA's (111) (110)

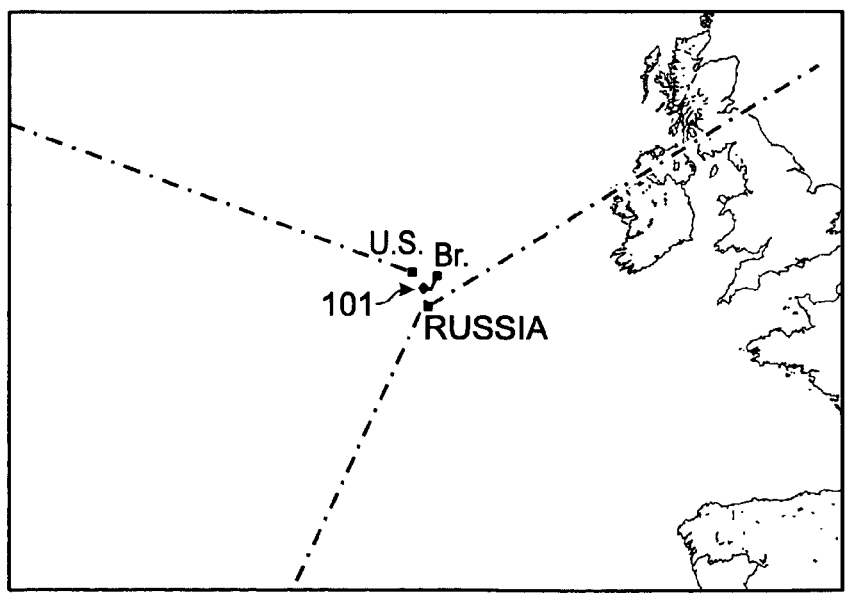

Fig. 21

LONG-RANGE LIGHTNING DETECTION AND CHARACTERIZATION SYSTEM AND METHOD

GOVERNMENT RIGHTS

This invention was made with Government support under contract 0233955 awarded by the National Science Foundation. The Government has certain rights in this invention.

FIELD OF THE INVENTION

The present invention relates to a long-range lightning detection and characterization system and method.

BACKGROUND

A number of lightning detection networks are currently in operation for detecting and locating cloud-to-ground (CG) discharges, i.e., discharges resulting in lightning strikes. The networks utilize a number of geographically dispersed sensors for sensing the RF emissions produced by the lightning.

It is also desirable to detect lightning strikes anywhere in the world, and so the sensors are likewise distributed across and around the globe. However, it is not practical to place sensors in many parts of the world, and it is costly to require more sensors than are needed, so it is of great practical advantage to utilize "long range" sensors. Such sensors are adapted to respond to ELF/VLF emissions (in the range of about 3 Hz-30 kHz), which are guided through the space between the earth's surface and the ionosphere, and therefore the sensors do not need to be within the line of sight of the strike. This provides a sensor range of up to about 10,000 km (about ¼ of the circumference of the earth).

To estimate the location of a lightning strike, lightning detection systems perform a triangulation based on data obtained from a number of geographically dispersed sensors. All but one prior art long-range lightning detection network triangulate based on what are known in the art as "time of arrival" (TOA) measurements. Each sensor has a GPS synchronized clock and determines the absolute time that a particular part of an RF emission is sensed. TOA data from a number of sensors are compared to obtain the difference in arrival time of the emission at the different sensors. Each time difference defines a hyperbola on which lie points of possible locations for the lightning strike. In general, N sensors define N−1 hyperbolas, and a minimum of three hyperbolas are necessary to triangulate a location unambiguously. For this reason, at least four sensors, positioned within a sufficient proximity to a strike to detect and measure the RF emissions, are generally necessary to provide the data needed to triangulate the position of the strike, and the use of additional sensors is highly desirable to improve the estimate.

One prior art detection network utilizes "angle" or "azimuth" measurements. The angle measurements are obtained from the ratio of outputs of a crossed loop magnetic field antenna. If angle measurements are accurate enough, triangulation can be performed using angle information only. However, angle measurements at long distances are known to have substantial errors, perhaps around 5 degrees. Where the sensor may be located up to 10,000 km from the lightning strike, a 5 degree error can produce an uncertainty in location of nearly 900 km. In long-range detection systems, a 5 degree error has been found to be unacceptable, with the result that triangulation is not performed with angle measurements. In the one prior art system that employs angle measurements, they are used as a supplement to TOA measurements.

In all the prior art systems, triangulation is performed at a "central analyzer" to which the sensors transmit their data over a communications channel for analysis.

In addition to determining the location of a lightning strike, it is considered important in the art to determine as well its peak amplitude and polarity. The emission produced by a lightning strike initially has a waveshape, polarity, and amplitude, and all of these characteristics of the wave change as the wave propagates. As a result of interaction of the wave with the surface of the earth and the ionosphere, by degrees as a function of the distance traveled, the wave becomes attenuated and more complex, and the polarity changes. The wave interacts with the earth differently over land than water, and interacts differently with the ionosphere depending on whether it is day or night. In TOA measurements, it is not possible to know that a particular point on the wave as it is initially produced maps or corresponds to a particular point on the wave as it is received, guaranteeing significant TOA measurement errors. It is likewise not possible to know how polarity as perceived at the sensor corresponds to initial polarity. So it is a severe drawback of prior art long-range lightning detection systems and methods that the emitted wave degrades over long distances to a point where it does not provide sufficient intelligible information about the original lightning strike to characterize the strike as desired.

SUMMARY

Long-range lightning detection and characterization systems and methods are disclosed. In a representative method for detecting and characterizing a subject lightning strike at a strike location, electromagnetic radiation produced by the strike is sensed at a sensing location and a measured signal representative of the strike is produced that defines a subject amplitude versus time. A set of reference data containing waveforms comparable to the measured signal is established. The set of reference data defines a set of reference amplitudes versus time, representative of one or more predetermined reference lightning strikes at various predetermined distances, where for each of the distances, the reference lightning strikes have associated therewith various predetermined day/night percentages. The measured signal is compared with the reference data, the comparison including finding a correlation between the measured signal and a correlating waveform in the reference data. At least one of a propagation distance, a time-of-arrival, a polarity, and an amplitude of the measured signal is inferred by reference to the correlating waveform.

Preferably, to assist in finding the correlation so as to reduce processing time, the angle of arrival of the first measured signal is determined, and a terminator distance from the sensing location to the day/night terminator is determined based on the angle and corresponding to a time that may be loosely associated with the onset of the first measured signal.

The lightning strike may be characterized by a precise time-of-arrival. Preferably, a precise time-of-arrival of the measured signal is determined by a method in which the correlating waveform has associated therewith a predetermined delay time and propagation distance d. The delay time of the correlating waveform indicates, relative to d/c, the first time the reference amplitude of the correlating waveform reaches either (a) a predetermined first threshold fraction of the maximum reference amplitude, or (b) a zero-crossing after the first time the reference amplitude of the correlating waveform reaches a predetermined second threshold fraction of the maximum reference amplitude. The method then includes identifying, on the measured signal, a subject time corresponding to the delay time of the correlating waveform, where the subject time represents time-of-day. If the delay time of the correlating waveform represents the first time the reference amplitude of the correlating waveform reaches (a), the subject time indicates the first time the amplitude of the measured signal, as compared to the maximum amplitude of the measured signal, reaches the first threshold fraction. On the other hand, if the delay time of the correlating waveform represents the first time the reference amplitude of the correlating waveform reaches (b), the subject time indicates the nearest zero-crossing of the measured signal for which the amplitude of the correlating waveform and the amplitude of the measured signal move in the same direction. In either case, the characterization defines the time-of-arrival of the measured signal according to the subject time.

The methods summarized above are typically performed at a single sensor for detecting the lightning strike. Typically, the sensor is part of a multi-sensor system having a plurality of sensors spaced substantial distances apart from one another. The sensors in such systems transmit corresponding data to a central analyzer for further processing. More particularly, the central analyzer performs a multi-sensor locating computation for estimating the strike location, the sensor summarized above being adapted for transmitting at least one of the propagation distance, time-of-arrival, delay time, amplitude, and angle of the measured signal to the central analyzer over a communications channel. The multi-sensor locating computation utilizes at least one of these data corresponding to the measured signal along with one or more other indicia of strike location obtained from the other sensors in the system. The central analyzer is adapted for computing a revised propagation distance from the strike location to the subject location based on the multi-sensor locating computation, associating, by reference to a second set of reference data in accord with the delay time, a revised delay time of the measured signal with the revised propagation distance, and correcting the time-of-arrival in accord with the revised delay time.

Preferably, the first set of reference data correspond to discrete propagation distances, to minimize processing time, and to compensate, the second set of data provides for more precision, preferably by fitting the same set of reference data as utilized at the sensors with, e.g., regression curves so as to interpolate the second set of reference data to obtain said revised delay time.

Preferably, a second multi-sensor locating computation is performed utilizing the corrected time-of-arrival, and where the difference between the propagation distance d and the corresponding revised propagation distance is large, it may be advantageous to continue iterating the multi-sensor locating computation.

The lightning strike may be characterized by its amplitude, typically though not necessarily specified as "peak current." For this purpose the processor may be further adapted for identifying an amplitude threshold marking point on the correlating waveform and a corresponding marking point on the measured signal, identifying respective amplitudes corresponding to the marking points, and comparing the respective amplitudes to infer an estimated representative amplitude associated with the lightning strike.

The correlating waveform has associated therewith a predetermined delay time. In a representative system that includes a central analyzer, remote from the sensor, the sensor is adapted for transmitting at least an indication of the delay time to said central analyzer over a communications channel. The central analyzer is adapted for estimating a propagation distance for the measured signal and finding a correction for correcting the representative amplitude by interpolating from a second set of reference data relating propagation distance and amplitude in accord with at least an indication of the delay time.

The lightning strike may be characterized by its polarity. The correlating waveform has an associated polarity, and the polarity of the measured signal may be inferred based thereon.

It is recognized herein that good correlations can be obtained, especially in long-range VLF lightning detection systems, for correlating waveforms having opposite polarities. Preferably then, correlating waveforms are found corresponding, respectively, to positive and negative polarities, wherein the correlating waveforms have associated therewith respective predetermined delay times and propagation distances such as $d_1$ and $d_2$. A representative system includes a central analyzer, remote from the sensor, the sensor adapted for transmitting at least an indication of the propagation distances $d_1$ and $d_2$ to the central analyzer over a communications channel. The central analyzer is adapted to obtain a first estimate, e.g., $d_3$ of propagation distance for said measured signal at the sensor based in part on data indicative of the strike location received from other remote sensors, comparing $d_3$ with $d_1$ and $d_2$, selecting one of the correlating waveforms as being representative of the measured signal based on the comparison, and utilizing the delay time associated with the selected correlating waveform to obtain a revised estimate, e.g., $d_4$ of propagation distance for the measured signal at the sensor.

Preferably, the central analyzer is adapted for utilizing the delay time associated with the selected correlating waveform to specify a subset of data from a second set of reference data relating propagation distance and delay, for identifying a corrected delay time associated with the measured signal.

To assist in the angle measurement, a representative method identifies a window of time, and obtains a plurality of samples of the electromagnetic radiation associated with the lightning strike. Each sample is representative of a pair of orthogonal spatial components measured at the same time, where different samples correspond to different times within the window. Data derived from the samples are aggregated to infer the angle.

Preferably, constituent pairs of frequency components are extracted from the respective samples, each pair of frequency components defining an ellipse having a major axis and associated angle, wherein for each pair, the associated angle is an estimate of the arrival angle.

Preferably, the window has an upper limit defined between (a) the first part of the measured signal that reaches a threshold of 25% of maximum amplitude and (b) the nearest subsequent peak of the measured signal.

Also preferably, with or without a limit on the window, the aggregating includes fitting a line to the samples by minimizing the sum of the shortest distances, from the respective samples, to the line.

Preferably, noise that may accompany the measured signal is mitigated. A novel method of electrical noise mitigation that may be used in conjunction with any of the methods described herein as well as in other contexts starts with an original signal that includes a desired signal in the presence of noise. The original signal is modified to isolate the noise, including by limiting the amplitude thereof to a predetermined maximum to suppress the desired signal, and adaptively filtering a result so as to pass the noise. The modified signal is coherently subtracted from the original signal, thereby substantially producing the desired signal without the noise.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DESCRIPTION OF THE DRAWINGS

FIG. 17 is a plot, delay versus propagation distance, of data resident at a central analyzer as shown in FIG. 2 representing a large number of signals K produced by CG lightning discharges, where delay is measured at threshold points of 25% and 50% on the signals according to the present invention.

FIG. 18 is a plot, delay versus propagation distance, of data resident at a central analyzer as shown in FIG. 2 representing a large number of signals K produced by CG lightning discharges, where delay is measured at zero-crossing points on the signals, reached after thresholds of 25% and 50% on the signals, according to the present invention.

FIG. 19 is a flow diagram of a method for correcting estimates of the location of a CG lightning discharge produced by the sensors of FIG. 1 at the central analyzer of FIG. 2.

FIG. 21 is a map of the Earth, showing the location estimates of FIG. 20 in more detail, along with a first revised estimate of the location of the discharge according to the present invention.

DETAILED DESCRIPTION OF PREFERRED EMBODIMENTS

Figure 1:
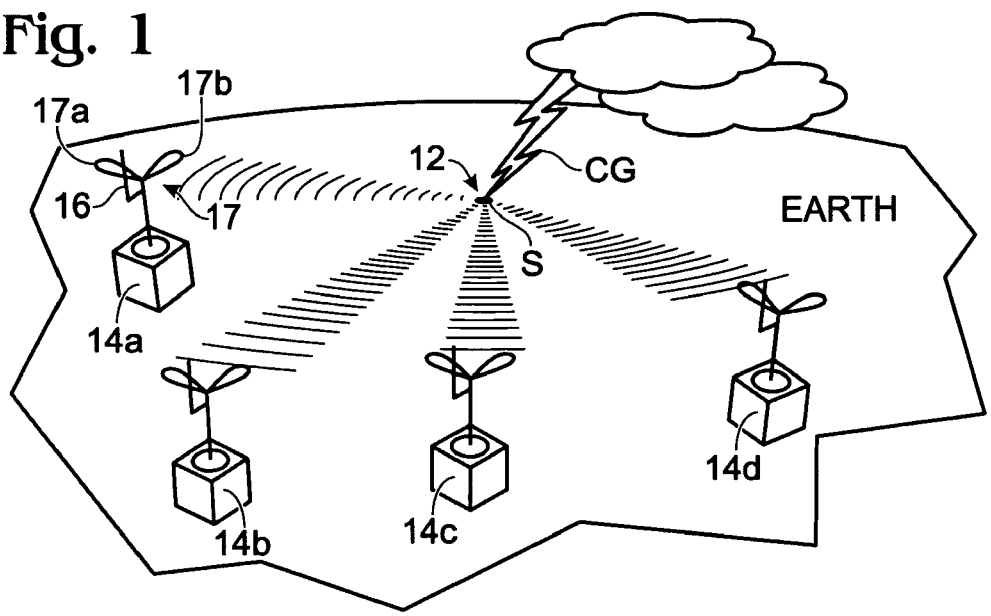
FIG. 1 is a schematic view of a lightning detection and characterization system according to the present invention.

FIG. 1 shows a long-range lightning detection and characterization system 10 according to the invention. A cloud-to-ground (CG) lightning strike (or inter-cloud and intra-cloud discharge with a sufficiently large vertical component—herein, either may be referred to as a "lightning strike" or "subject lightning strike") produces, at a source "S" on the earth, an RF emission 12.

Four sensors 14 (14a, 14b, 14c, 14d) are geographically dispersed at various locations on the earth for sensing the emission 12. Preferably, there are at least four sensors, and more preferably, there are more than four sensors.

Figure 2:
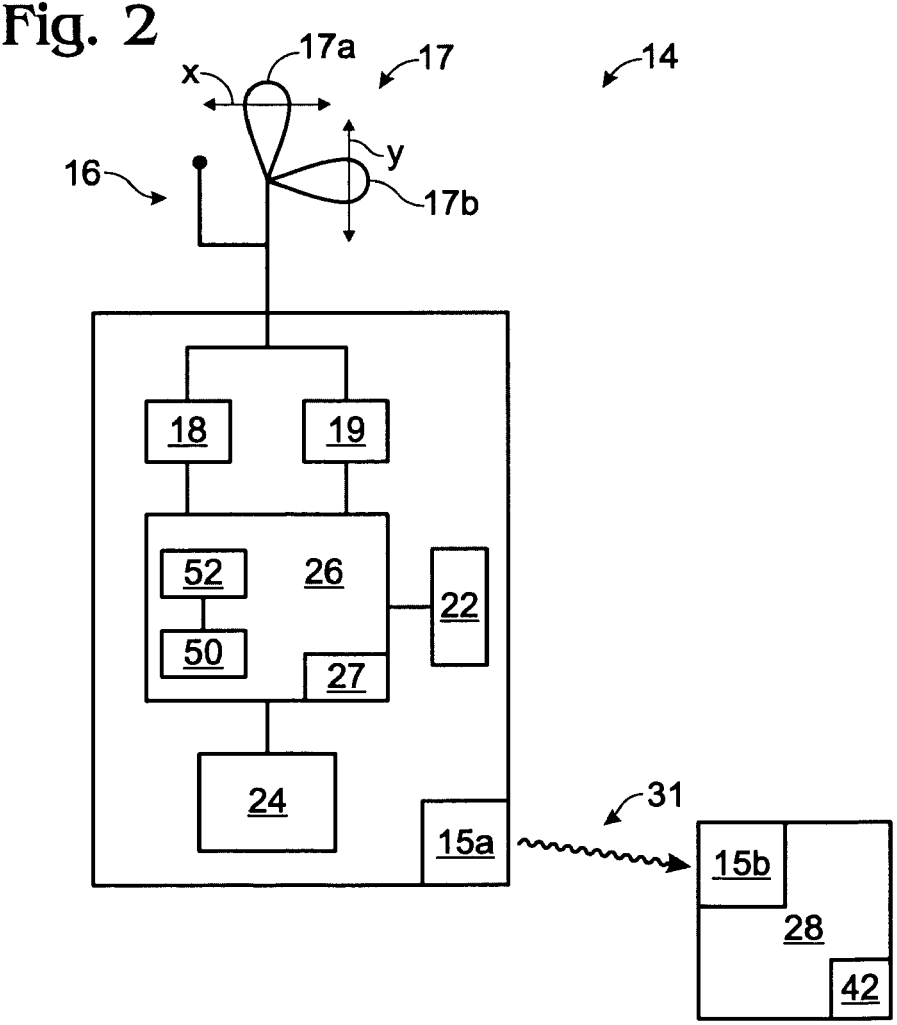
FIG. 2 is a schematic view and block diagram of one of the lightning detecting sensors shown in FIG. 1.
Figure 3:
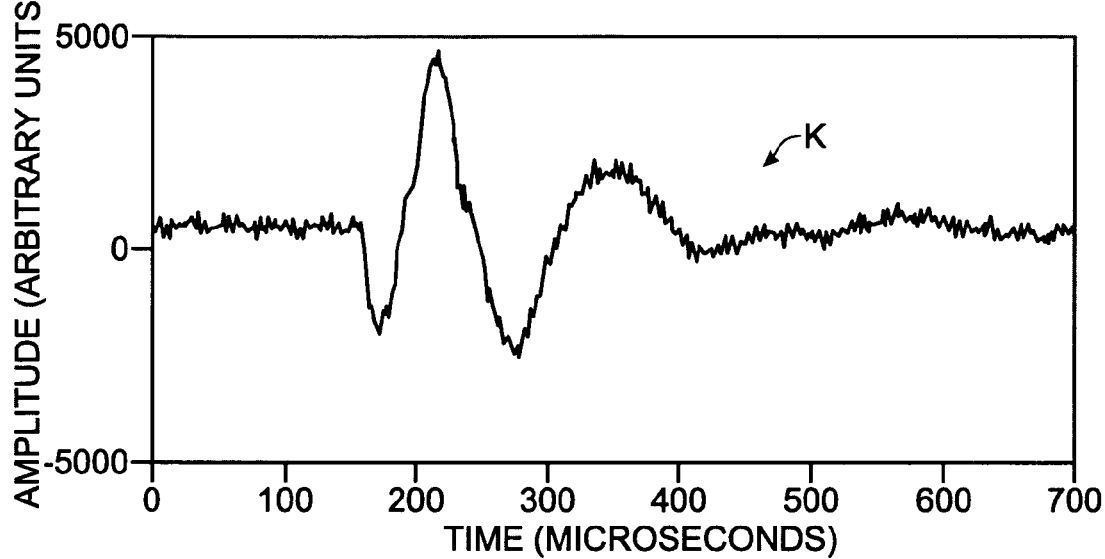
FIG. 3 is a plot, amplitude versus time, of a signal K produced by the lightning discharge of FIG. 1 as detected by one of the sensors of FIG. 2.

Turning to FIG. 2, each sensor includes an antenna 16 for detecting the electric field component or signal "E" (FIG. 3) of the emission 12, and a crossed loop antenna 17 (having loops 17a, 17b) for detecting the magnetic field components or signals "$M_x$" and "$M_y$" (not shown) of the emission 12 relative to two orthogonal directions "x" and "y" defining an azimuthal plane, e.g., N/S and E/W. As known in the art, the two magnetic signals allow for determining an arrival or azimuth angle for the RF emission 12. However, the present invention provides an improved, novel means for making this determination as described below.

Given the existence of the magnetic signals, it is not essential to also detect and measure the electric signal E, but as is known, it is highly advantageous to utilize all three signals to allow for the resolution of possible ambiguities. Moreover, any one of the signals E, $M_x$, and $M_y$ may be used as a proxy for the RF emission 12, and will be referred to herein as a signal "K" for generality. As will be readily apparent, the preferred signal K for purposes described herein will be the signal with the highest signal-to-noise ratio. The magnetic signals $M_x$ and $M_y$ are typically, though not necessarily, preferred for this reason. Where the magnetic signals are used, a combination of the $M_x$ and $M_y$ signals is typically preferred, such as the magnitude $(M_x^2 + M_y^2)^{1/2}$; however, this refinement will be ignored for purposes herein.

The antennae 16, 17 by their nature differentiate the signal K, and each sensor 14 therefore includes an integrator 18 for integrating the output of the antenna 16 and producing an electric current (or voltage) as a function of time that represents the signal K. The antennae and integrator therefore may be identified with a sensing portion of the sensor 14. The thusly reconstructed signal K (subject data) defines an amplitude "A" as a function of time and also defines a polarity "P" such as indicated (by +/−) in FIG. 3. The output of the integrator 18 is digitized and sent to a processor 26 for analysis as described below.

Figure 4:
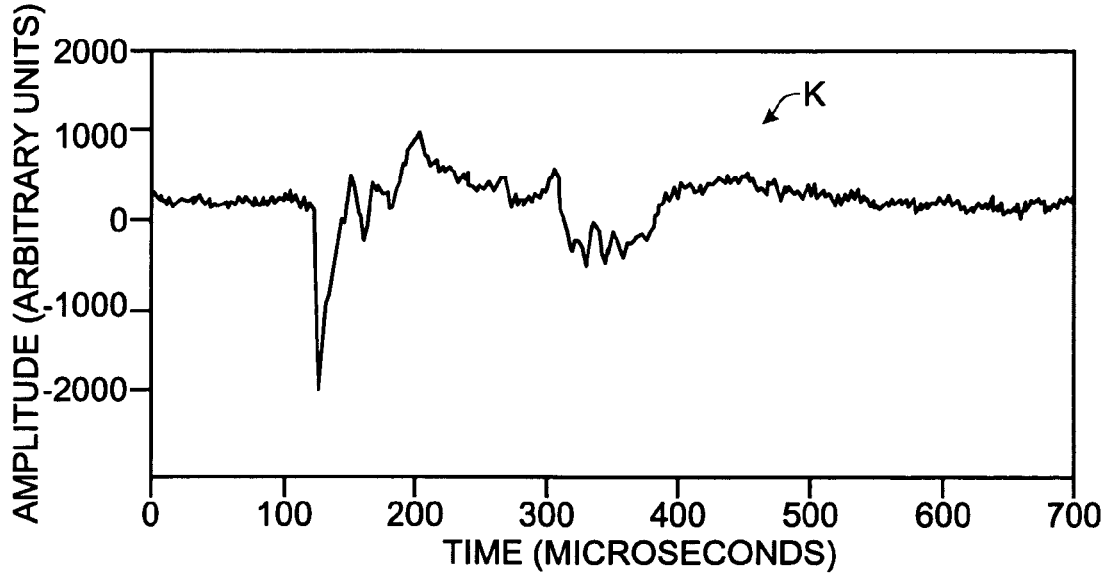
FIG. 4 is a plot, amplitude versus time, of the signal K as detected by a sensor of FIG. 2 that is at or near the source S of FIG. 1.

FIG. 4 shows the signal K as it would be received by a sensor 14 disposed at or near the source S. Such a signal K measured at or near the source will be utilized as described below, and will be referred to as "baseline data," defining an amplitude "$A_{baseline}$" as a function of time.

As the signal K is detected farther from the source, the shape of the signal changes significantly. For purposes of definition, the signal K measured at a sensor 14 will be referred to as "subject data." Subject data define an amplitude "$A_{subject}$" as a function of time.

Referring back to FIG. 2, an analog-to-digital converter 19 digitizes the output of the antenna 17 and provides the digitized output to the processor 26 for computation of the azimuth angle of receipt of the emission 12. This angle computation defines, within the angular error, a path over which the signal K propagated. Utilizing this angle measurement and an additional feature of the invention described below, each sensor is able to make its own estimate of the location of the lightning, i.e., the distance of the strike from the sensor along the line defined by the angle measurement.

As it is highly preferred as a practical matter to process the signal K digitally, the analog-to-digital converter 19 may also be identified with the aforementioned sensing portion of the sensor 14; however, it should be understood that converting the signal K to digital form is not essential to the invention, and the term "sample" as used herein is not intended to be limited to digital processing and includes any measurement.

The methodology to be described next relies on two important recognitions by the present inventors. First, the inventors have recognized that, at the source of the strike, a signal K for CG lightning will usually have substantially the same shape, though it may differ in amplitude and polarity. Second, the understanding in the art has been that the signals K change their shape, amplitude and polarity with propagation distance so much, and in dependence on so many different factors, that different signals cannot be meaningfully compared.

Figure 5:
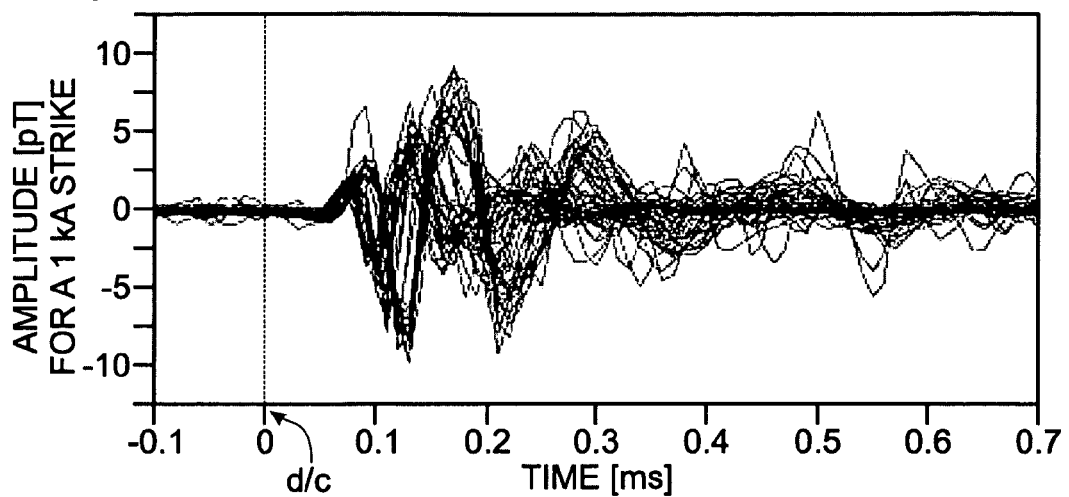
FIG. 5 is a plot, amplitude versus time, of a large number of signals K produced by CG lightning discharges detected at a particular distance from the respective sources of the discharges.

Even if propagation distance is controlled, the signals K continue to manifest large variability. FIG. 5 provides an example. It shows a number of different signals K at the same propagation distance (4600 km), and it is apparent that the signals vary substantially.

Figure 6:
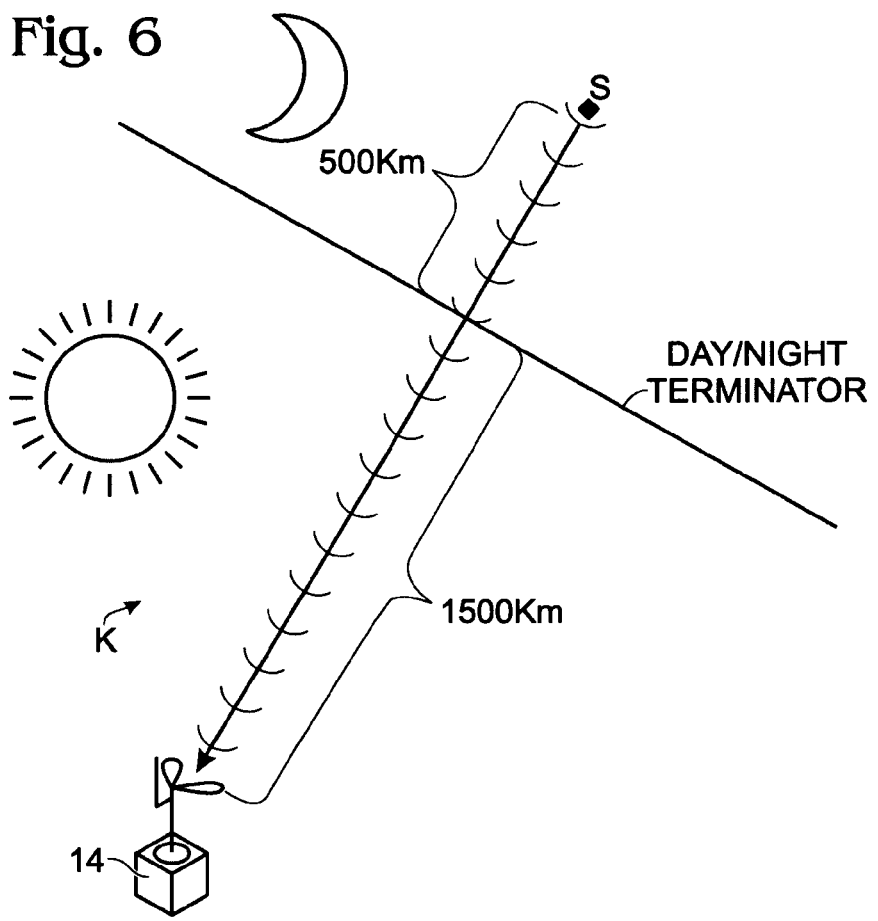
FIG. 6 is a schematic diagram illustrating the determination of a day/night percentage according to the invention.

Contrary to the general understandings in the art, the present inventors have recognized that, for a given propagation distance, different signals K will have substantially the same shape if just one other factor is controlled, the relative proportion of the path over which the signal travels which is (a) during the day and, (b) during the night. For example, with reference to FIG. 6, a signal K may travel 2000 km, 500 km of which occurred during night-time conditions and 1500 of which occurred during day-time conditions. In this example, the 2000 km path can be described as being 75% day/25% night (hereinafter "day/night percentage," it being understood that this metric can be specified in a number of different ways, such as by a fraction, proportion, or code).

Figure 7:
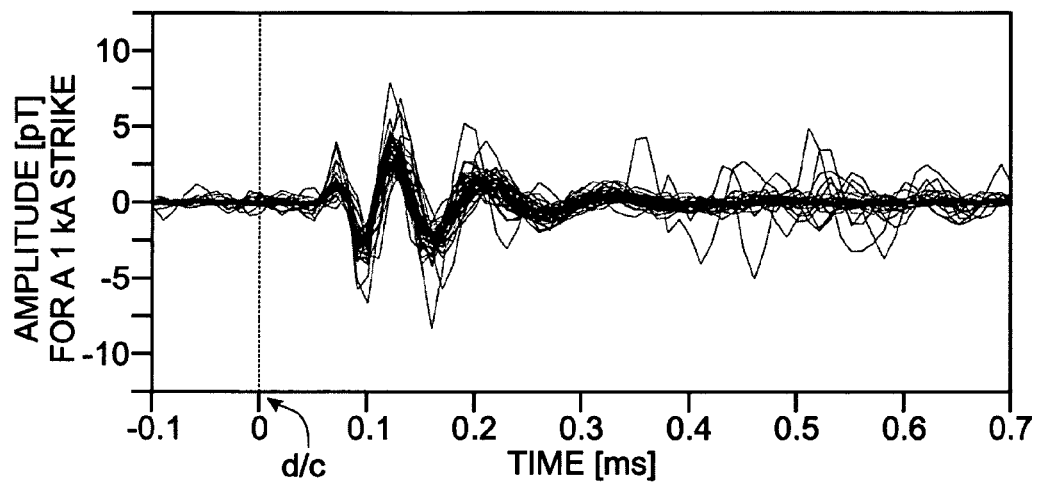
FIG. 7 is a plot, amplitude versus time, of a first subset of the signals K plotted in FIG. 5 corresponding to 100% daytime propagation.
Figure 8:
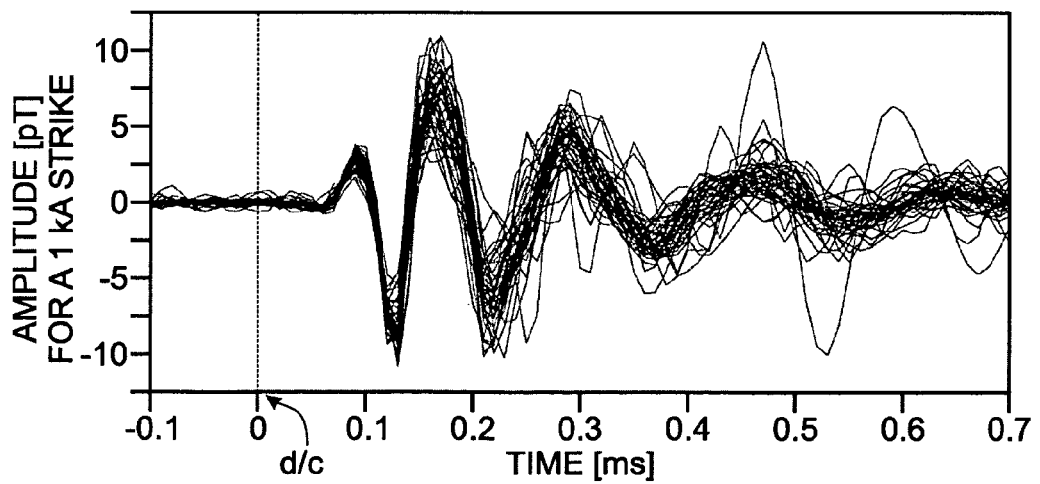
FIG. 8 is a plot, amplitude versus time, of a second subset of the signals K plotted in FIG. 5 corresponding to 100% night-time propagation.
Figure 9:
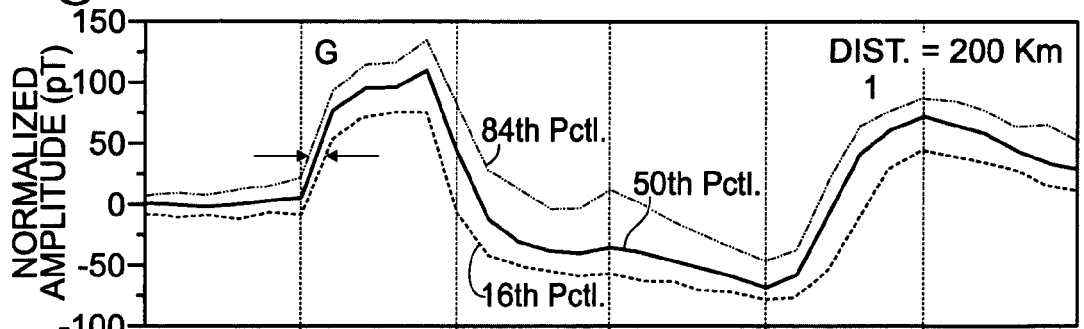
FIG. 9 is a plot, amplitude versus time, of a large number of signals K produced by CG lightning discharges detected at 200 km from the respective discharges, showing variance by percentile lines.
Figure 10:
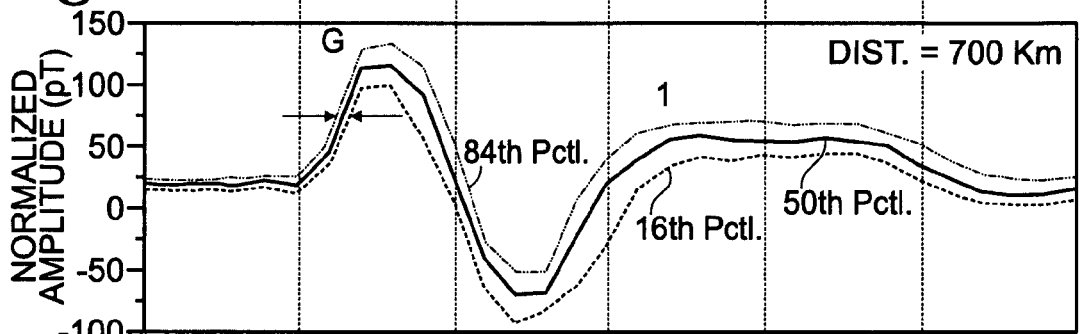
FIG. 10 is a plot, amplitude versus time, of a large number of signals K produced by CG lightning discharges detected at 700 km from the respective discharges, showing variance by percentile lines.

FIGS. 7 and 8 show an equal number of signals K as shown in FIG. 5, but controlling for the day/night variable, corresponding respectively to 100% day and 100% night-time propagation. It is apparent from these Figures that the signal K evolves characteristically with distance once the day/night percentage variable is removed.

The characteristic nature of the evolution of the signal K over distance is shown in FIGS. 9-12, plotting amplitude versus time for various signals K propagating various distances in the daytime, particularly distances of, respectively, about 200 km, 700 km, 2000 km, and 4400 km from the discharge. As can be seen in each Figure, the signal ranges within bounds that represent a small standard deviation relative to the amplitude changes in the signal, providing for a characteristic wave shape at each distance. Moreover, as can be seen by comparing the Figures, the wave shapes evolve over distance in a characteristic way.

Figure 11:
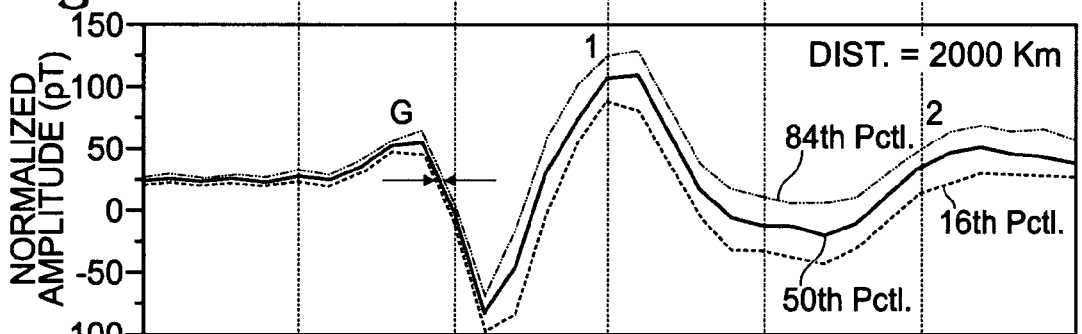
FIG. 11 is a plot, amplitude versus time, of a large number of signals K produced by CG lightning discharges detected at 2000 km from the respective discharges, showing variance by percentile lines.
Figure 12:
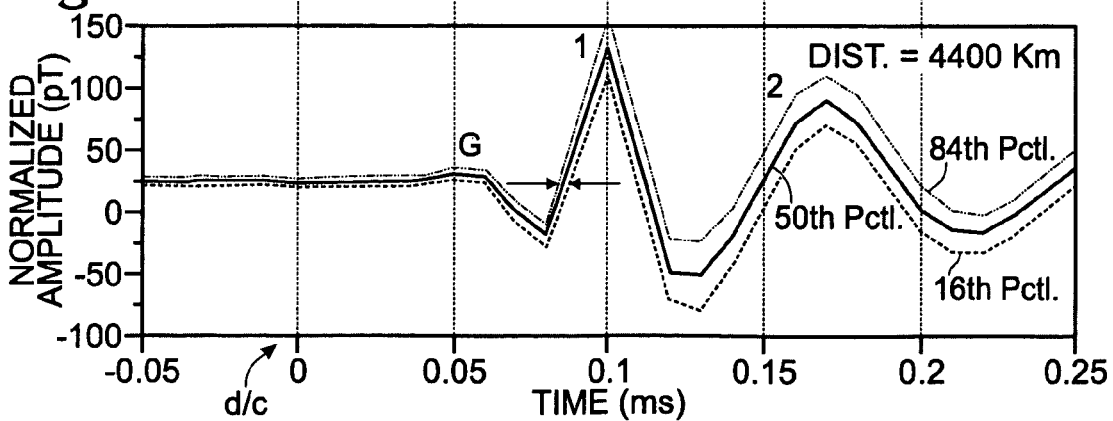
FIG. 12 is a plot, amplitude versus time, of a large number of signals K produced by CG lightning discharges detected at 4400 km from the respective discharges, showing variance by percentile lines.

Each of the signals K in FIGS. 9-12 have two peaks labeled "G" (for "ground wave"), and "1" which represents a first wave reflected from the ionosphere (FIGS. 11 and 12 also show a second reflected wave peak "2"). As can be seen, the amplitude corresponding to the "G" peak decays with distance, but the reflected peak "1" increases in amplitude relative to the "G" peak with distance.

A line "d/c" is shown in each Figure for which the time is taken as being zero, where "d" is the (great circle) distance from the strike to the sensor at which the waveform is or would be received, and "c" is the speed of light. This line accounts for the propagation time that occurs simply as a result of the distance traveled, referred to as speed of light propagation. By "normalizing" the signals to this line, the differences in time that one expects simply as a result of a signal propagating over a smooth, perfectly conducting surface, over the various distances, are accounted for.

However, the surface and atmospheric conditions affect propagation time to extend it beyond the line d/c, defining a "delay" relative to propagation on a smooth, perfectly conducting surface. Such delays can be seen in FIGS. 9-12 by comparing the locations (along the time axis) of the peaks of the signals. For example, by comparing FIGS. 10 and 11, it can be seen that the onset of the G peak is delayed as a result of the signals propagating a longer distance. On the other hand, the Figures show progressive advancement of the peak "1" toward the d/c line with increasing propagation distance (corresponding to decreasingly positive delays).

The recognition that, once day/night percentage is removed as a variable, signals K propagate characteristically allows use of a data bank of reference waveforms corresponding to one or more signals K at various known or established propagation distances and day/night percentages for comparison with any signal K measured at the sensor. When a measured signal K correlates with a reference waveform in the data bank, the already established parameters that define the reference waveform can be assumed to characterize the measured signal K as well. This provides the outstanding advantage of permitting at least preliminary assessments of the location of the strike, its polarity and peak current at the sensor such as in the manners described below.

Figure 13:
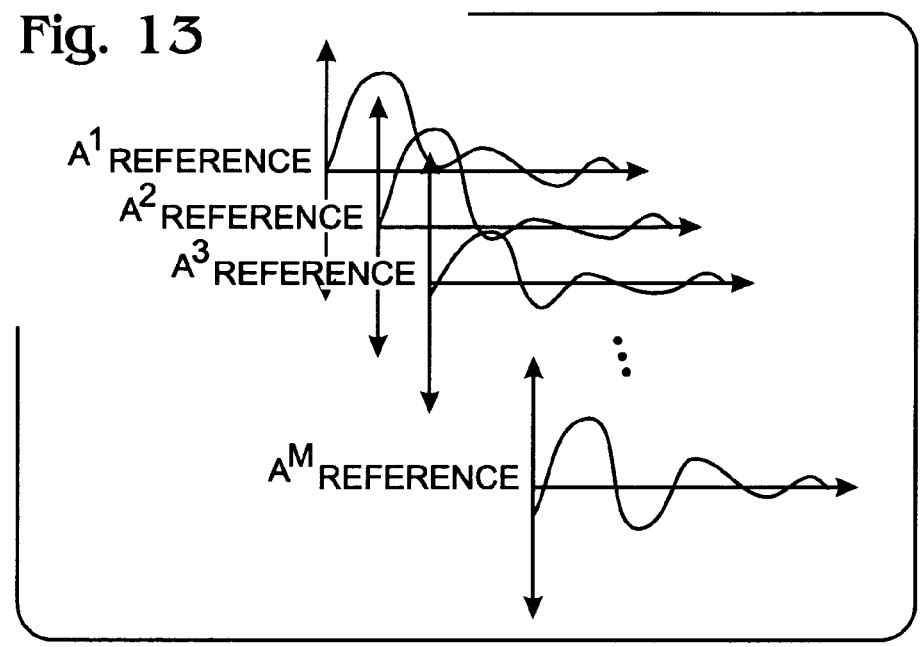
FIG. 13 is a schematic diagram indicating data in a data bank resident at each of the sensors of FIGS. 1 and 2.

Accordingly, each sensor 14 includes a data bank 22 (FIG. 2) containing a catalog of signals K which have propagated various distances ("reference data set"). The data bank 22 indicates how a generic signal K ("reference data") changes shape with varying distances from the strike and thereby defines various unique "reference functions" having corresponding amplitudes "$A_{reference}$" as functions of time, such as shown in FIG. 13 ("$A^1_{reference}$"; . . . "$A^2_{reference}$"; "$A^M_{reference}$"; where M=distance of propagation). The data bank 22 is preferably implemented as a look-up table storing digitized samples of the signals, but the data bank may be implemented in any desired alternative manner and may include as much or as little data as is necessary or desirable to sufficiently characterize the signals for the purposes described herein.

The data bank is preferably populated using waveforms measured at a variety of distances for which the source lightning discharge positions are accurately characterized by a shorter-range, precision lightning location system, such as the National Lightning Detection Network ("NLDN"). As an alternative to, or in combination with, this preferred methodology, the data bank may be populated by using one or more waveforms measured at close range and propagating the one or more waveforms to various distances by mathematical modeling.

Each sensor 14 includes a clock 24 (FIG. 2) that keeps time and date relative to the same standard, e.g., GMT, and the processor 26 is adapted to determine the distance from the sensor to the day/night terminator based on time and seasonal information received from the clock 24, the known coordinates of the sensor, and the angle measurement. The reference data set includes data corresponding to a number of different distances from the source S of the RF emission 12 (FIG. 1), and for each distance, a number of different day/night percentages.

For example, distances may step linearly from 500 km-10,000 km in 500 km increments. In a preferred embodiment of the invention, distances range from 50 km-7000 km in increments that increase logarithmically, i.e., greater increments for greater distances. More generally, nonlinear increments may be beneficial to reduce the amount of data in the reference data set at the greater distances where the signal K is not as sensitive to distance. Another alternative in the context of nonlinear increments is to divide a desired range into zones in which distances may be incremented differently.

Day/night percentages are typically incremented linearly, e.g., from 0-100% in 10% increments, but nonlinear increments may also be utilized to reduce the amount of data in the reference data set where the signal K is less sensitive to changes in day/night percentage.

The day/night terminator changes so slowly relative to the measured signal K that, for purposes of selecting reference data from the reference data set that are consistent with the location of the day/night terminator, any time, including but not limited to the below-described time-of-arrival, within minutes of the onset of the signal K may be used to establish the location of the day/night terminator at the time-of-arrival of the signal K.

Preferably, for each of the distances, data corresponding to two sets of different day/night percentages are provided, one in which the signal K travels first during the day and then during the night, and the other in which the signal K travels first during the night and then during the day, though this is not essential.

Accordingly, the reference data set may define a matrix of reference functions $A_{reference}$ (m, n, p) in which the index "m" specifies a distance, the index "n" specifies a day/night percentage, and the index "p" specifies whether the signal first travels during the day or first travels during the night. While additional confounding data may be incorporated to improve the accuracy of the method, it is an outstanding feature of the present invention that the reference data set may be kept reasonably small, by resolving lightning generated signals K into just two variables.

The baseline data may be measured for one or more actual lightning strikes, or may be otherwise specified, such as by computer modeling. Based on the premise that CG lightning looks substantially the same at or near the source except that it may have either of two polarities and a range of amplitudes, the baseline data may represent the same lightning strike.

The processor 26 preferably utilizes the computed location of the day/night terminator to select a subset of day/night percentages that are appropriate for each possible propagation distance along the measured azimuth. For example, if the day/night terminator is known to be 1500 km away, such that for lesser distances the signal K necessarily propagates during the day, then the day/night percentage selections for any distance less than 1500 km should be 100%. The processor would preferably not, in this example, select data from the reference data set corresponding to alternative day/night percentages.

The processor 26 then performs the correlation, typically a lag correlation, between each of the waveforms of the aforementioned subset to find the best matching or best correlated (highest correlation) reference data. The matching reference data define a propagation distance from the baseline data that is presumed to be the distance that the subject signal K has traveled. In conjunction with the measured azimuth, this establishes a preliminary assessment of the location of the strike.

The precision of the assessment is limited by the granularity of the reference data. For example, if the reference data correspond to propagation distances that vary in 100 km increments, a strike located at 7,684 km would ideally register as being at 7,700 km.

The correlating reference waveform also has associated with it a known polarity, which will in the preferred embodiment (but which need not necessarily be) the same for all the reference waveforms, so that finding the correlating reference waveform can immediately provide a preliminary assessment of the polarity of the measured signal K.

However, preferably according to the invention the correlation is run for a signal K of two polarities, conceptually defined as multiplying the measured signal K by both +1 and −1, i.e., both the measured signal K and its negative. If the polarity of the measured signal K is the opposite of the polarity of the reference waveforms, the negative of the original signal will generally provide for a closer and therefore better correlation. In practice, two correlations need not be run, because the minimum correlation is equivalent to multiplying the signal by −1, and the maximum correlation is equivalent to multiplying by +1.

The correlating reference waveform also has associated with it a known amplitude (as a function of time), as well as a known peak current. The reference waveforms are typically normalized so that the peak current is set to unity, but this is arbitrary. The amplitude(s) of the measured signal K is compared to the amplitude(s) of the reference waveform to scale the measured signal K, thus providing a preliminary assessment of the peak current of the measured signal K.

Preferably, a scale factor relating the amplitude(s) is obtained by relating the amplitude of the first point on the received signal to reach a given threshold, e.g., 50%, or 100%, of the maximum amplitude of the signal to a point on the reference waveform that is defined in the same way. It is possible to base the scale factor on more than one point; however, it is recognized by the present inventors that it is desirable to utilize points that occur earlier in time relative to the evolution of the signal K.

Preferably the preliminary assessments of location, polarity, and peak current are refined at a central analyzer to be discussed next. However, the preliminary assessments could provide useful characterizations of the lightning strike without any further refinement.

Referring back to FIG. 2, each sensor 14 includes a transmitting component 15a for transmitting data over a communications channel 31 to a central analyzer 28 that receives data from all the sensors. The communications channel 31 is typically the Internet, but could be any desired communications link between the sensor and central analyzer, the details of which are of no particular pertinence to the invention.

According to the invention, each sensor 14 transmits the following information to the central analyzer 28: (1) an estimated location of the lightning discharge, (2) a time-of-arrival ("TOA") of the measured signal, and (3) a delay associated with the correlating reference waveform.

As indicated above, the sensor estimates location as being the distance determined from the correlating reference waveform along the measured angle. As a fully equivalent alternative to determining and transmitting a location estimate to the central analyzer, the sensor 14 may omit any determination of location and send the information on which this estimate is or could be based, namely the distance and angle. Generally, any information from which location can be determined or inferred, hereinafter referred to as "location information," can be used as the aforementioned data item (1).

Figure 14:
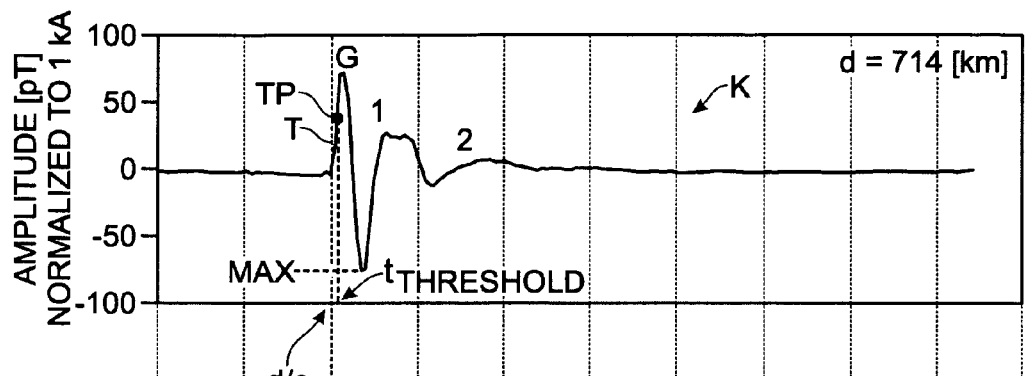
FIG. 14 is a plot, amplitude versus time, of a particular signal K produced by a CG lightning discharge detected at 714 km from the discharge, illustrating marking points and the methodology for their determination according to the present invention.
Figure 15:
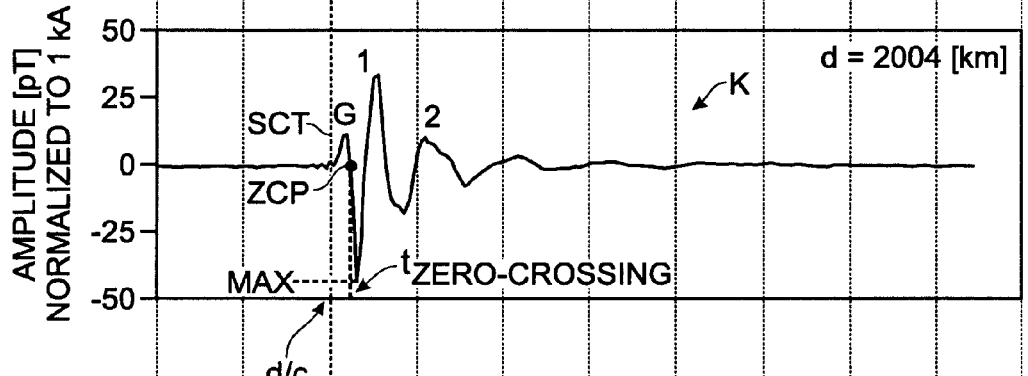
FIG. 15 is a plot, amplitude versus time, of a particular signal K produced by a CG lightning discharge detected at 2004 km from the discharge, illustrating marking points and the methodology for their determination according to the present invention.
Figure 16:
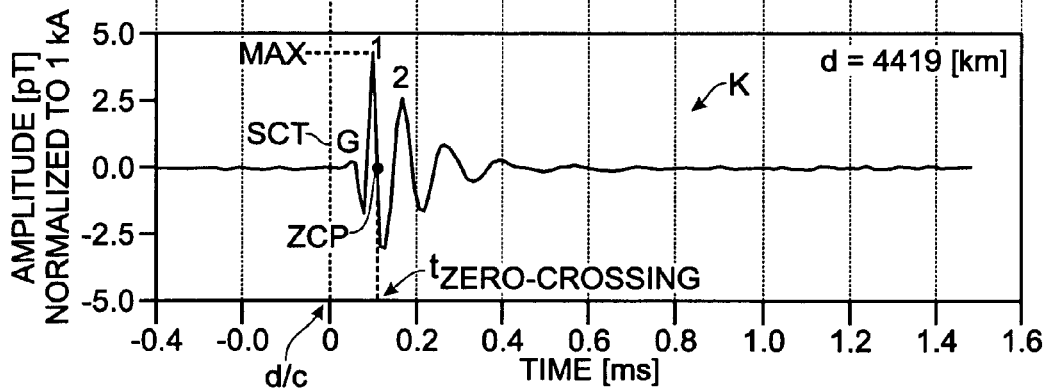
FIG. 16 is a plot, amplitude versus time, of a particular signal K produced by a CG lightning discharge detected at 4419 km from the discharge, illustrating marking points and the methodology for their determination according to the present invention.

Background for understanding the data items indicated above as (2) and (3) is provided next in connection with FIGS. 14-16, showing an idealized signal K corresponding to those shown, respectively, in FIGS. 9-12.

Referring to FIG. 14, the signal amplitude increases with time starting at the d/c=0 line until reaching the peak G. A point of maximum slope, and therefore maximum sensitivity to this rise, is preferably selected at a threshold ("T") of, e.g., 50% of the maximum signal amplitude of the entire waveform ("max"). This point is referred to herein as a "threshold" point ("TP") and has associated with it a time "$t_{threshold}$." Aside from the preference for a threshold point of maximum sensitivity to the rise of the signal K, the threshold point is arbitrary and so other values of the threshold point could be used.

FIG. 14 illustrates a signal K that is less than 1000 km from the strike. For signals K at such distances, the peak G is pronounced and the threshold point TP is utilized as a TOA marking point on the signal.

FIG. 15 represents a signal K that is greater than 1000 km from the strike. At distances greater than about 1000 km, the peak G is typically too small to establish a TOA marking point, and therefore it is preferable to utilize an alternative marking point, as next described.

In the example of FIG. 15, while rising at G, the signal K reaches a signal commencement threshold ("SCT") amplitude indicating that the signal has commenced and risen above the noise. The threshold SCT may be taken at, e.g., 25% of the maximum signal amplitude ("max"). Thereafter, the signal may continue to rise but will eventually fall to zero amplitude at a time "$t_{zero-crossing}$," which is the first "zero-crossing point" ("ZCP") subsequent to the signal having reached the signal commencement threshold.

At propagation distances over about 1000 km, the threshold point is an unreliable marker, because it can be highly sensitive to the attenuation of the G portion of the signal at such distances. So for signals propagating more than a predetermined amount that is preferably though not necessarily about 1000 km, the zero-crossing point is utilized as the TOA marking point.

As background for understanding how the zero-crossing point is utilized, it should be understood that the correlating process essentially slides the reference waveform along the time axis until it comes into best registration with the measured signal K. The measured signal K and the reference wave-form have threshold and zero-crossing points that roughly align for the closest correlating waveform. This alignment is generally sufficient that the threshold and zero-crossing points on the measured signal K that correspond to the threshold and zero-crossing marking points on the correlating reference waveform are identifiable.

As established above, in FIG. 15, the zero-crossing point ZCP is the first zero-crossing point. However, in FIG. 16, showing a signal K at a propagation distance of about 4400 km, the signal K first reaches the threshold SCT on the "1" peak rather than the G peak, and so the zero-crossing point ZCP represents the second time that the signal K makes a zero-crossing. So, depending on the portion of the signal on which the threshold is first reached and the sensitivity of the threshold at that point to "jumping" from one half-cycle of the signal to another, the correlating waveform can "snap" to the wrong zero-crossing point of the signal K in the correlating process.

It is therefore recognized that, to utilize the zero-crossing as a marking point, the zero-crossing is first identified on the correlating reference waveform, where it is stable (by definition). Then, the closest corresponding zero-crossing point on the measured signal K is identified for which the correlating waveform and the measured signal K are moving in the same direction.

While preferred marking points have been described along with strategies for their specification, it should be understood that any other marking points could be used, and that any number of marking points can be used. It may be noted with reference to FIGS. 9-12 that the preferred marking points are taken at earlier portions of the measured signals, where the variance in the signals K tends to be less, providing for greater accuracy.

The sensor's processor 26 stores, in a memory 27, at least sufficient portions of the signal K to allow going back, once the maximum signal amplitude is determined, to determine the location of the marking points.

The aforementioned clock 24 is used by the sensor 14 to relate the TOA marking point to standard time, and the resulting time defines the TOA that is transmitted by the sensor to the central analyzer 28. Preferably, the time standard is that utilized in the GPS system.

As mentioned above, the sensor 14 also transmits a delay to the central analyzer. The delay that is used is the delay associated with the correlating reference waveform. Delay is implicit in time-of-arrival measurements, being related (for a strike at time t=0) according to:

$$\text{TOA} = d/c + \text{delay} \tag{1}$$

TOA was determined immediately above for the measured signal K by reference to a marking point on the measured signal K. The marking point may be established as described above as being a threshold point or a zero-crossing point. Both the measured signal K and the correlating reference waveform have associated therewith corresponding marking points. So the TOA as established by the marking point on the measured signal K can be considered to have associated therewith a delay as established by the corresponding marking point on the correlating reference waveform. For example, the TOA measured at the marking point on the measured signal K may be 5:00 PM and the delay associated with the correlating reference waveform at the corresponding marking point may be 50 microseconds.

It is recognized as being desirable to "calibrate" for the delay according to equation (1), so that the signal K can be referenced to speed of light propagation. This can be done by subtracting the delay from the TOA, e.g., in the example above by subtracting the 50 microsecond delay from the 5:00 PM TOA for the measured signal K.

The correlating reference waveform generally will not correlate perfectly with the measured signal K, for two reasons. First, while accounting for day/night percentages removes a substantial amount of the variability in lightning signals, it does not remove all variability. More importantly, however, the data in the data banks 22 of the sensors 14 are granular or discrete, to save processing time (for correlation) at the sensors. So, for example, if a data bank 22 contains reference waveforms for distances in 500 km increments, a measured signal K from a lightning strike 5300 km away cannot find a corresponding correlating waveform for the same distance, and would probably be correlated with either a 5000 km reference waveform or a 5500 km reference waveform, ensuring some error.

So the delay utilized in the calibration procedure described above is not generally the correct delay. However, by sending the delay, or information from which the delay may be determined, to the central analyzer 28, the sensor 14 provides the central analyzer an opportunity to correct the delay and thereby perform a better calibration. One feature of the central analyzer providing this capability is the existence of reference data at the central analyzer which has a finer granularity than the reference data at the sensors. This finer granularity can be supplied by additional or different data, but preferably it is provided by interpolating the same data available to the sensors as will be described below.

The central analyzer 28 typically (though not necessarily) knows the geographical locations of the sensors, which are typically (though not necessarily) fixed. Accordingly, so that the central analyzer can relate the data received from the sensors to a particular location, and therefore compute a propagation distance from a source S to each sensor, each sensor preferably transmits to the central analyzer, in addition to the data items (1)-(3), an identifier that identifies the sensor or its location.

In addition to errors in delay and location as estimated by the sensor 14, there may also be an error in the assessment of polarity. To address all of these potential errors and inaccuracies, the central analyzer 28 is adapted according to the invention to provide refined estimates of the location of the lightning strike and its polarity utilizing the information transmitted from the sensors and a second data bank 42 that also contains reference information, as mentioned above. With reference to FIG. 2, the central analyzer 28 includes a receiving component 15b for receiving data transmitted from a sensor 14, and also includes a processor 29 for accessing the second data bank 42 and carrying out the processing steps described below.

Particularly, the data bank 42 contains information relating propagation distance and delay. The data in the data bank 42 may take different forms and may be coded in different ways, but an example of the information contained in the data bank 42 is shown in FIGS. 17 and 18. These Figures plot delay versus distance corresponding to a number of reference waveforms, defined by marking points that are, respectively, threshold points and zero-crossing points, each determined using the same specification strategies as the marking points used in the data bank 22 and on the measured signals at the sensors 14. Data for both 25% and 50% thresholds are provided in both Figures, for illustrative purposes.

The data are preferably fitted with curves, e.g., regression curves, that facilitate interpolation between the data points. The curves serve the dual purpose of smoothing out the data as well as providing contiguity to compensate for the granularity in the data at the sensors.

If, like the reference data in the data bank 22, the reference data in the data bank 42 correspond to discrete propagation distances, values for intermediate propagation distances are obtained by interpolation, generally by fitting curves to the marking points for which data are available.

The data in the data bank 42 are utilized in conjunction with the information received from the sensors 14, corresponding to the same lightning discharge, to provide refined characterizations of the discharge as follows: With reference to FIG. 19, at a first step 100, the central analyzer performs a standard multi-sensor locating computation based on information provided by all the sensors, e.g., distance, arrival angle, times-of-arrival, and amplitude (discussed below). The multi-sensor locating computation can be triangulation, trilateration, or a combination of the two, and may be any known method or technique for discerning the location of an event based on sensing the event at different remote locations. The multi-sensor locating computation is preferably obtained by using available location dependent data to minimize a standard cost-function as known in the art, wherein different measurements can be directly compared if the measurement errors are scaled by the appropriate standard deviations. In any case, the multi-sensor locating computation produces a first refined estimate 101 of the location of the discharge.

Figure 20:
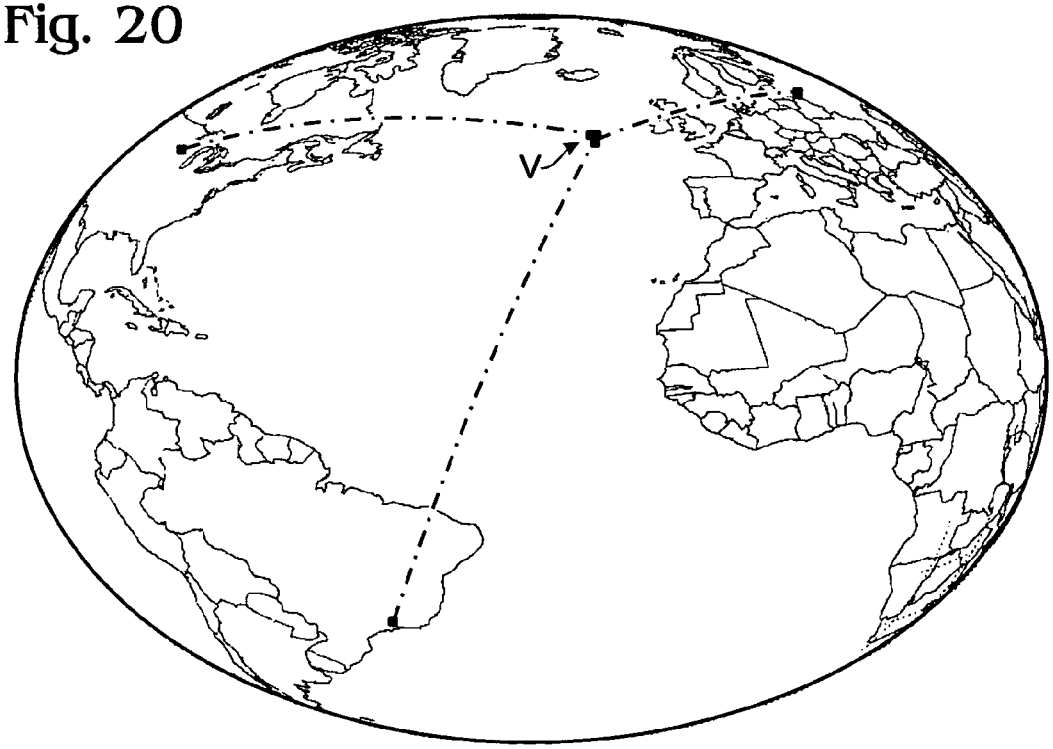
FIG. 20 is a map of the Earth, showing (a) the location of a CG lightning discharge, (b) the location of three sensors that have detected the lightning discharge, and (c) three initial estimates of the location of the lightning discharge produced by three sensors according to the present invention.

To illustrate the result of the multi-sensor locating computation, FIG. 20 shows location data obtained from three sensors, located in Brazil, Russia, and the USA (near Minneapolis), locating a lightning discharge in the vicinity "V," off the Irish coast. FIG. 21 shows the location data "US" "Br," and "Ru," along with the first refined estimate 101.

Returning to FIG. 19, at a next step 102, the central analyzer determines first revised estimates 103 of the distance from the discharge to each of the sensors, corresponding to the first refined estimate 101 of location, utilizing the known or transmitted geographic locations of the sensors.

At a next step 104, the central analyzer determines, for each of the first revised distance estimates 105, corresponding corrected delays 106 by consulting data in the data bank 42, represented here as mentioned above by FIGS. 17 and 18.

More specifically, as mentioned above, if the distance determined at the sensor is less than a predetermined amount, the TOA and delay described above are based on the threshold marking point. On the other hand, if the distance is greater than the predetermined amount, the TOA and delay are based on the zero-crossing marking point. In the case where the threshold marking point was used, the delay as corrected by the central analyzer is the delay corresponding to the threshold marking points in FIG. 17, whereas if the zero-crossing point is used, the delay is corrected by use of the zero-crossing point data in FIG. 18.

As an example, if the first refined estimate of location of the lightning discharge corresponds to a propagation distance to sensor 14a (FIG. 1) of 2000 km, the data shown in FIG. 18 would be consulted by the central analyzer to specify a corrected delay 106 because the propagation distance is greater than 1000 km.

It may be noted that there is an apparent ambiguity as to which of, generally, two curves (e.g., those referenced as "A" and "B" in FIG. 18) to choose in selecting the corrected delay. However, there is no actual ambiguity by design. The data corresponding to the different curves in FIGS. 17 and 18 are predetermined to be associated with reference waveforms having known delays. The data in the data bank 42 of the central analyzer are likewise predetermined and consistent with the data in the data bank 22.

If the data in the data banks 42 and 22 are based on the same reference waveforms, then FIG. 17 or 18 contains the precise data point corresponding to the delay reported by a sensor is in the data bank 42, which also identifies the appropriate curve.

On the other hand, the data in the two data banks 42 and 22 may be based on different reference waveforms. In that case the precise data point corresponding to the delay reported by a sensor may not be represented in either FIG. 17 or 18. Nevertheless, the data in the two data banks are consistent by design, so that the delay reported by a sensor is ensured to lie on or very close to one of the curves.

The delays 106 are better estimates of the delay than those transmitted by the sensors both because they reflect an improved estimate of distance and because of the interpolation provided in the data bank 42.

Figure 22:
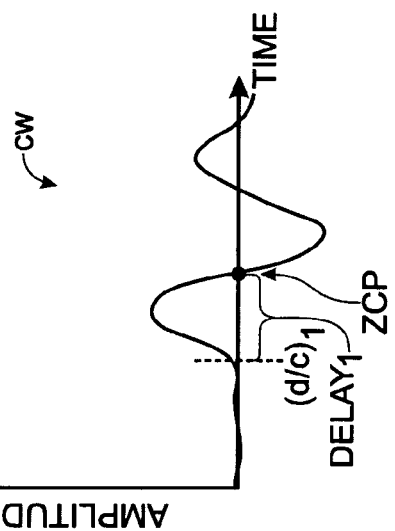
FIG. 22 is a plot, amplitude versus time, of a measured signal for illustrative purposes.
Figure 23:
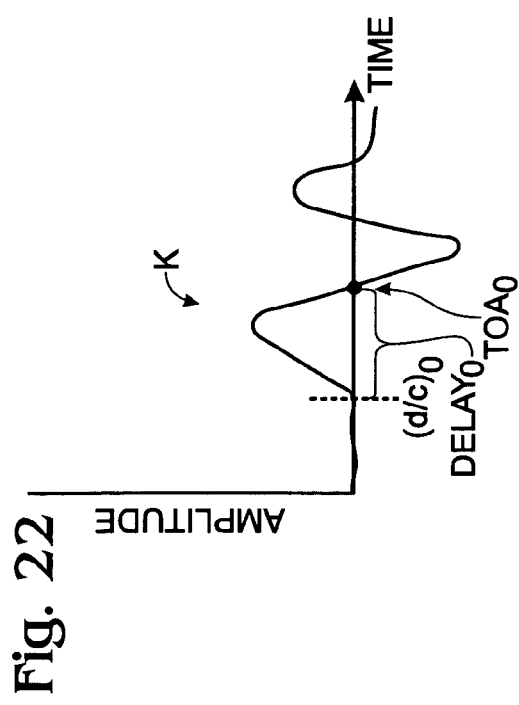
FIG. 23 is a plot, amplitude, versus time, of a correlating waveform corresponding to the measured signal of FIG. 22.

In a next step 108, the central analyzer corrects the TOA's determined by the sensors. This can be accomplished in different ways, as next described by reference to FIGS. 22 and 23. These Figures show, respectively, a measured signal K and a correlating waveform "CW." The measured signal K has associated with it a speed of light propagation $(d/c)_0$, $delay_0$, and time-of-arrival $TOA_0$. As an example, assume that $TOA_0$ is 5:00 PM. The delay, i.e., $delay_0$, establishes the speed of light propagation $(d/c)_0$, however, $delay_0$ is not known.

In correspondence, the correlating waveform CW has associated with it a speed of light propagation $(d/c)_1$, $delay_1$, and a time-of-arrival ZCP, where in this example the first zero-crossing is used as the time-of-arrival marking point. For the correlating waveform, both the time-of-arrival ZCP and delay, are known.

The sensor 14 sends to the central analyzer $TOA_0$ either the value delay, or an indication of the correlating waveform CW that was utilized by the sensor in the correlation. From this, the central analyzer can determine (a) the value of $delay_1$, or (b) the correct regression curve to use in FIG. 18 (in this case) for determining the corrected delay 106, where it is understood that the value of delay, also specifies the correct regression curve for the reason discussed above.

It may be assumed that $delay_0 = delay_1$ as a first approximation, and based on that assumption, the sensor may calibrate the measured signal K to speed of light propagation by calculating $(d/c)_0 = TOA_0 - delay_1$, and this result may be sent to the central analyzer as a proxy for $TOA_0$. In that case, $(d/c)_0$ may be corrected for error in the delay determined by the central analyzer, i.e., a difference between the delay 106 and $delay_1$, as follows:

$$(d/c)_{0\text{-corrected}} = (d/c)_0 + (delay_1 - \text{delay } 106) \quad (2)$$
$$= TOA_0 - \text{delay } 106.$$

On the other hand, if the sensor 14 sends $TOA_0$ to the central analyzer, the central analyzer can immediately form equation 2. It should therefore be readily apparent that there are a number alternative ways to specify the problem and make the correction. In any case, the central analyzer corrects the TOA's 111 for the sensors by utilizing the corrected delay 106.

The central analyzer preferably also overlays additional corrections on the TOA's as is standard practice, e.g., according to the now standard methodology described in U.S. Pat. No. 6,868,339. Briefly, the surface of the earth is partitioned into a grid, each grid element defining a time-independent correction factor associated with a given sensor, for correcting the data from that sensor for the known surface conditions affecting propagation from the grid element to the sensor. While this technique performed at the central analyzer is known in the art, it is a novel advantage of the present invention that the technique may be employed at the sensors 14, because the sensors are able to determine an estimated location of the lightning strike according to the invention without the assistance of a central analyzer. However, such correction is not made at the sensors in the preferred embodiments of the invention.

In step 110, the revised TOA's can then be used in another multi-sensor locating computation, using the revised time-of-arrival and distance estimates as well as any original parameters that have not been corrected such as arrival angle and amplitude, to obtain a further improved estimate of the location of the lightning. This further improved estimate takes advantage of the use of the data bank 22 at the sensors to improve the input to the multi-sensor locating computation, as well as the additional data provided by the data bank 42 to improve the output of the multi-sensor locating computation, in sum providing far greater location accuracy than that heretofore possible.

If the distance estimates provided by the initial multi-sensor locating computation (step 102) is largely in disagreement with the revised estimate obtained in step 110, then it may be useful to iterate steps 104-110.

It is to be understood that the data shown in FIGS. 17 and 18 correspond to a subset of the reference functions $A_{reference}$ (m, n, p) as described above, particularly where at least the index "n" (day/night percentage), and preferably the indices "n" and "p" (initial propagation during day or night), is specified. Accordingly, to enable the central analyzer 28 to provide corrections as described above, each sensor 14 preferably transmits to the central analyzer at least a representation of the index "n" along with the other data items (1)-(3) mentioned above.

It is recognized that there is a possibility for error in the correlations which can lead to unreliable results. An error may be noticed because the delay reported by the sensor contributes by far the largest error in the cost-function, or the polarity indicated by the sensor disagrees with the polarity as reported by a majority of the other sensors.

An error may result from a failure to find an adequately good correlation with any reference waveform. To set a limit on this type of error, the processor 26 of a sensor 14 may compare the correlation coefficients for a tentative correlating waveform against predetermined limits and simply report no data if a correlation within those limits cannot be made.

Figure 24:
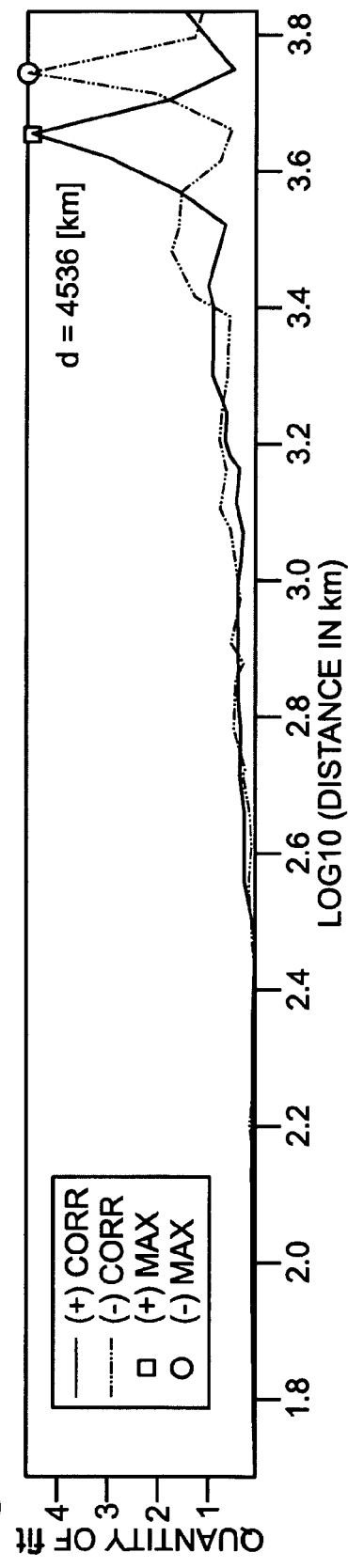
FIG. 24 is a plot, quality of fit versus ($Log_{10}$) propagation distance, achieved in correlating a received signal K with reference data resident at a sensor of FIG. 1 utilizing both positive and negative values of the signal.

An error may also result from an incorrect correlation, i.e., a good correlation with a reference waveform of the wrong polarity. For example, FIG. 24 shows fitness of correlation plotted against (log) distance for a 4536 km lightning strike of −16.7 kA (i.e., negative polarity). Substantially equally good correlations were obtained for the measured signal and its negative, resulting in ambiguity in both polarity and distance at the sensor.

This type of error is particularly likely where the lightning strike is far from the sensor, where the zero-crossing point is used as a marking point, because the signal changes more slowly with distance at larger distances, so that distance is more difficult to discern. If the polarity is incorrect, the wrong zero-crossing point will be identified.

To address the potential for polarity errors, each sensor preferably transmits to the central analyzer 28, along with the aforementioned data items (1)-(3), the polarity determined by whether best correlation was achieved with a positive (e.g., +1) or negative (e.g., −1) multiplier applied to the measured signal K.

The central analyzer may determine or assess polarity based on comparing the polarity assessments provided by the different sensors. This may be accomplished in any desired way; the most straight-forward way is to assume the polarity is that determined by the most sensors, by use of a voting algorithm.

It may also be desirable when performing the aforementioned method steps 100-110, to omit data from one, more or all of the sensors for which the polarity is determined by the central analyzer to be incorrect.

However, a preferred solution to the problem according to the invention is for the sensor 14 to transmit two (or more) sets of data to the central analyzer having nearly equally good correlations, allowing the central analyzer to perform a location calculation using each set and to select the set which results in the lowest cost function. More particularly, each sensor 14 preferably sends the threshold and zero-crossing delay information associated with the closest correlating reference waveforms of both polarities. Thus, where the central analyzer decides that a polarity is incorrect, it may use the delay for the opposite polarity in steps 100 through 104 prior to proceeding to step 108.

Each sensor preferably also transmits to the central analyzer 28 an amplitude associated with the correlating reference waveform, to provide for determining or assessing the peak current of the lightning strike. The amplitude is preferably taken at an amplitude marking point of 50% of maximum signal amplitude, but it may be taken at other points on the signal K, e.g., the same marking point utilized for the TOA measurement, the maximum signal amplitude, or the maximum amplitude of the G portion of the signal, without departing from the principles of the invention.

The sensor compares the amplitude of the measured signal K at the amplitude marking point to the amplitude of the correlating reference waveform at a corresponding marking point, which defines a scale factor. The correlating reference waveform amplitude is normalized to a standard (e.g., to 1 kA). Therefore, multiplying the scale factor by the standard current provides an assessment of the peak current of the measured signal K.

The central analyzer may then review the different assessments and, e.g., average them to obtain an improved peak current assessment. The central analyzer may also ignore or weight the peak current assessment of one or more sensors based on the polarity analysis described above.

Preferably, the central analyzer determines revised peak current estimates from the sensors 14 using a procedure analogous to the interpolation of delay described above in connection with corrected TOA's. It is readily appreciated that, since the signal K attenuates with distance, an error in the estimate of distance will result in a commensurate error in the peak current. Again, because the data at the sensor represent only discrete distances, distance error is likely.

Figure 25:
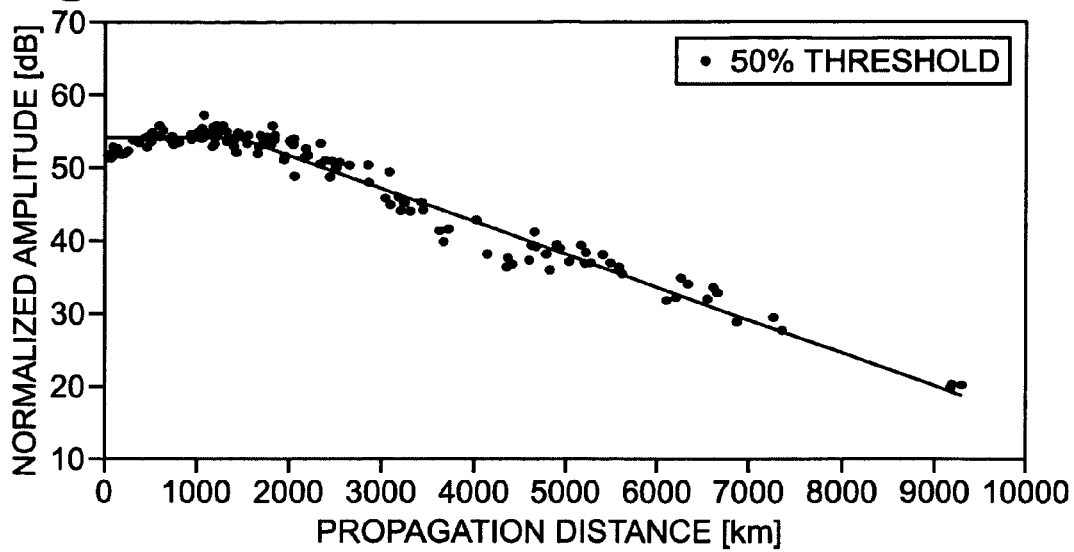
FIG. 25 is a plot, amplitude versus propagation distance, of data resident at a central analyzer as shown in FIG. 2 representing a large number of signals K produced by CG lightning discharges according to the present invention.

Accordingly, the data bank 42 preferably includes reference data, for the given amplitude marking point mentioned above, relating propagation distance and amplitude, such as represented by FIG. 25. As described in more detail above, the central analyzer 28 performs a multi-sensor locating computation based on the measurements from a number of sensors, obtains a refined location estimate, and re-computes the propagation distances for the sensors. This was used to obtain a corrected delay by consulting data in the data bank 42 representative of the relationship between propagation distance and delay such as illustrated in FIGS. 17 and 18. In an entirely analogous manner, the central analyzer 28 can correct the amplitudes as determined or assessed by the sensors by consulting data in the data bank 42 representative of the relationship between propagation distance and amplitude as such as illustrated in FIG. 25.

In the example of FIG. 25, the data are expressed in dB so that they provide a multiplicative correction factor for correcting the scale factor reported by the sensor, as compared to the additive correction used to correct the delay as described above in connection with use of the data in FIGS. 17 and 18. However, whether corrections are made by adding or multiplying is not important to the invention, as corrections can be made either way, and in general, any number of mathematical manipulations or transformations can be made consistent with achieving results described herein according to the principles of the invention.

It may also be noted that the data in FIG. 25 are normalized to account for cylindrical spreading, and it should be understood that this normalization is also unrelated to the invention. In general, as will be readily appreciated, data in either of the data banks 22 and 42 may be expressed, manipulated, and utilized in any desired manner consistent with achieving any of the results described herein.

Alone or in combination with any of the above procedures, peak current as derived from one or more sensors may also be adjusted at the central analyzer by applying a known attenuation factor, unrelated to the reference data described herein, correcting for the difference(s) between the length(s) of the finally determined propagation path(s) to the sensor(s) and the length(s) of the propagation path(s) assumed by the sensor(s).

As will be readily appreciated, for making best use of the invention it is of great practical benefit to reduce the error in the measured azimuth or angle as much as possible, since this measurement is utilized in the sensor's first estimate of the location of the lightning strike, which in turn is utilized for determining the night/day percentage that allows meaningful comparison to the reference waveforms in the data bank 22. It should be understood that all of the signals K have the same arrival angle, i.e., that associated with the RF emission 12.

The standard prior art methodology for measuring arrival angle in lightning detection systems is to measure the magnetic signals $M_x$ and $M_y$ at a particular time, and infer that the arrival angle $\theta = \tan^{-1} M_y/M_x$. Where the signals are linearly polarized, this is an accurate method; however, the signals are not in general linearly polarized. They are more linearly polarized at smaller delay times, i.e., earlier in their evolution over time, and they are more linearly polarized during the G portion of the signal. Under such conditions, the arrival angle determined as above may provide acceptable accuracy. However, generally, the signals are elliptically polarized, and arrival angles determined by taking the arctangent of the ratio of the signals will vary depending on the relative phases of the signals at the time of the measurement.

To mitigate this problem, preferably, a number of samples of $M_y/M_x$, taken at different times, during a window of time that extends between a lower threshold "$t_{lower}$" at which the signal K, which may be any of E, $M_x$ and $M_y$, reaches an amplitude that is reliably above the noise and therefore can provide reliable data, to an upper threshold "$t_{upper}$," above which the signal K has evolved too far into the regime of elliptical polarization. Preferably, $t_{lower}$ corresponds to the first point on the signal K that reaches an amplitude of 25-50% of maximum signal amplitude, while $t_{upper}$ corresponds to the first corresponding peak of the signal K (so that the signal continues to rise—or continues to fall—from the time $t_{lower}$ to the time $t_{upper}$). These thresholds may occur on the G portion of the signal if the sensor 14 is close to the lightning, but may occur on the "1" or even the "2" portion of the signal, where the signal is significantly elliptically polarized, if the sensor is far from the lightning.

Figure 26:
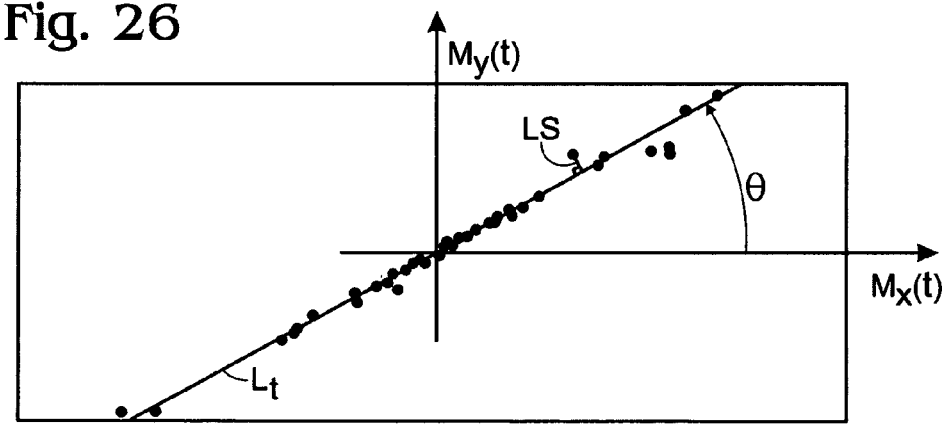
FIG. 26 is a plot, plotting against each other two orthogonal magnetic field signals K, providing an estimate of arrival angle according to the invention.

Preferably, rather than simply averaging the angles θ, the corresponding samples $M_x$ and $M_y$ are utilized as data points to which a line is fitted. This is illustrated in FIG. 26, where samples $M_x$ (x axis) and $M_y$ (y-axis) for various times are plotted against each other, showing that they lie, generally, along a line.

To establish the line, the present inventors have recognized that a least-squares methodology is inappropriate, because it assumes independent/dependent variable relationships, and produces errors. Instead, according to the invention, a line "$L_t$" is fitted to the data so as to minimize the squared errors from the data along line segments "LS" perpendicular to the line $L_t$, such as indicated in FIG. 26 (one being shown exaggerated due to the generally small size of the line segments).

Figure 27:
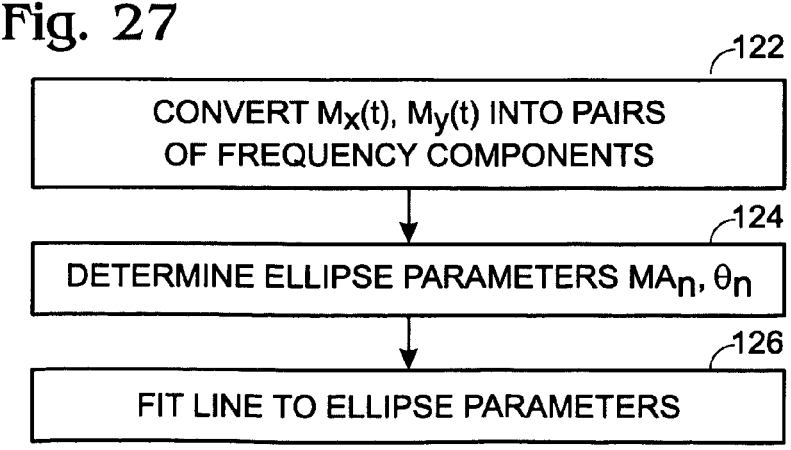
FIG. 27 is a flow diagram of a method for determining arrival angle according to the present invention.

An equivalent method can be performed in the frequency domain. With reference to FIG. 27, at a step 122, the time-domain signals $M_x$ and $M_y$ are converted into constituent pairs of frequency components corresponding to positive frequencies "n" and the associated negative frequencies "−n." Each pair of frequency components defines an ellipse having a major axis $MA_n$ and an associated angle $θ_n$.

In a step 124 of FIG. 27, the parameters $MA_n$, $θ_n$, for a frequency "n" can be found by first forming the complex signal $M(t)=M_x(t)+jM_y(t)$, and decomposing the result into positive and negative phasors $A_0 e^{j\phi 0}$ and $A_1 e^{j\phi 1}$, where for each frequency n:

$MA = A_0 + A_1$; and $θ = (\phi_1 + \phi_2)/2$.

To convert the signals $M_x$ and $M_y$ into frequency components in step 122, a discrete Fourier transform (DFT) may be performed on the signals for a time window within the aforementioned time limits $t_{lower}$ and $t_{upper}$, to obtain the Fourier decomposition of the signal M(t) for all frequencies corresponding to the time window, from which the $MA_n$ and $θ_n$ are obtained. As preferred practice, however, a complex DFT is performed on the complex signal $M_x(t)+jM_y(t)$.

Figure 28:
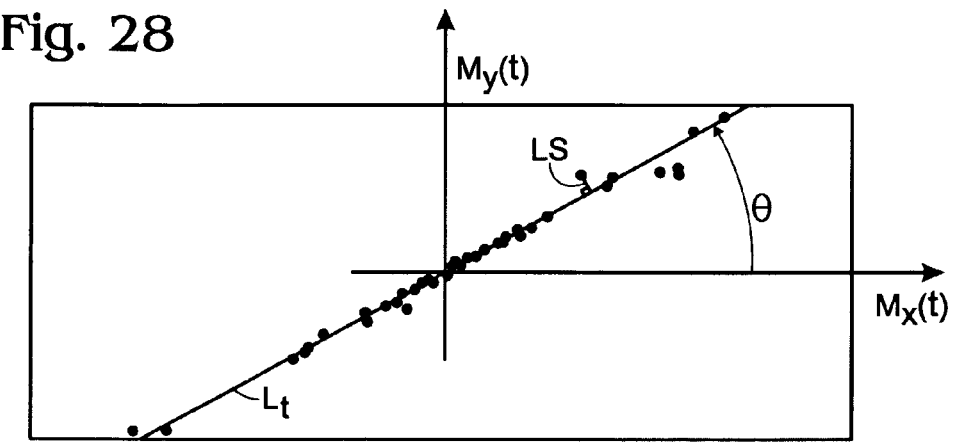
FIG. 28 is a polar plot converted to Cartesian coordinates, of mathematically derived parametric data associated with ellipses defined by frequency components of two orthogonal magnetic field signals K, providing an estimate of arrival angle according to the invention.

Analogous to fitting the line $L_t$ to the time domain data, in a step 126, a line "$L_f$" may be fitted in the same manner to the data ($MA_n$, $θ_n$), the direction of which establishes an estimate of the arrival angle, as shown in FIG. 28 (converted to Cartesian coordinates). All of the aforementioned operations are typically carried out in the processor 26.

To summarize, in general, a pair of data elements measured from a corresponding pair of orthogonal signals K defines an angle that approximates the arrival angle, and the angles defined by multiple pairs of data corresponding to multiple, different times or frequencies depending on method, are aggregated to obtain an estimate of the arrival angle at a sensor 14. Preferably, this aggregating is accomplished by fitting a line to the data, where each datum defines a line segment joining the datum and the line, the line segment being perpendicular to the line, so as to minimize the sum of the squares of the lengths of the line segments. However, other aggregating techniques may be employed, including simply averaging the $θ_n$'s.

As discussed previously, the signal K can be any of E, $M_x$ and $M_y$, and it should be understood that the aforementioned upper and lower thresholds may be established relative to any of these signals.

The errors LS (FIG. 26) indicate lack of linear polarization and provide a confidence, or lack-thereof, that the arrival angle has been determined accurately.

The frequency domain methodology provides a similar indication of confidence in the arrival angle, based on the aggregate data, e.g., all the data plotted together. However, the frequency domain methodology also provides another indication of confidence in the ellipticity of the individual ellipses defined by the $MA_n$, $θ_n$. Particularly, each ellipse has a minor axis:

$m = |A_0 - A_1|$, that, by comparison to the major axis MA, indicates ellipticity.

It should be understood that there is no intention, in the description of a preferred methodology for determining arrival angle, that it is essential to determine arrival angle by any particular method to practice the invention, and any methodology for assessing arrival angle, including prior art methodologies, and methodologies yet to be determined, may be employed.

The present inventors have also recognized the importance of mitigating noise at the sensors 14 that is non-lightning related. Two particularly significant VLF/ELF noise sources are narrow-band (NB) transmitters and power lines. The United States Navy, for example, broadcasts on various channels between 20 and 25 kHz, depending on location, and power line noise contains harmonics that can be significant even at frequencies of 5 kHz and higher.

It is recognized as being desirable in the context of the present invention to maintain the signal K in its entirety and so simply filtering the noise out of the signal K is not preferred. Rather, the invention preferably utilizes a coherent subtraction methodology performed by the processor 26 (FIG. 2), whereby a signal "J" that is representative of the noise is subtracted from the signal K.

An overall signal K+J is obtained by processing the output of the antennae 16 and/or 17. This signal (or a representation thereof) is input to one or more pass-band filters 50 (FIG. 2) having pass-bands with center frequencies that are either known or determined to be associated with the noise. Thus, the output of the filters 50 generally reflects only the noise, so that the processor 26 may obtain a clean signal K for analysis as described above by coherently (i.e., preserving time and phase relationships), subtracting the output of the filters 50 from the measured signal K. In preferred practice, the filters 50 are implemented in software resident in the processor 26.

It is recognized that power-line noise has a center frequency that changes with time. Also, NB transmitters are phase-modulated, so that their phase changes significantly over a few cycles of the signal. In both cases, the changes are sufficient to make it beneficial in the context of the present invention to use adaptive filters that can be trained to follow the noise. Accordingly, the filters 50 are preferably adaptive filters. In the preferred embodiment, the filters follow changes in center frequency, and the rapid changes in the phase of the signals transmitted by the NB transmitters are accounted for by setting the bandwidth to a predetermined amount known to be sufficient to accommodate the changes.

It is further recognized by the present inventors that the adaptive filtering can be thrown off by the presence of substantial signal resulting from a lightning strike. That is, if the adaptive filters are hunting for the center frequency or phase of a component of the noise signal J (hereinafter "hunting") during the time that there exists substantial lightning signal amplitude, the filters will have a more difficult time finding the correct center frequency or phase associated with the noise.

One potential solution to this problem is to prevent the filters from hunting when the signal amplitude reaches a certain threshold indicative of the onset of a lightning signal. This solution is practical for power-line noise, which has a center frequency that changes relatively slowly as compared to the time-frames in which measurements of the signal K are made according to the invention. However, the phases of NB transmitters change fast enough that it is believed to be disadvantageous to cease hunting during the time lightning signals K are being measured. This is found to be true despite the fact that the measurements are made relatively early in the evolution of the signals K.

It is also possible to cease hunting temporarily while a lightning signal K is being measured, resume hunting after the lightning signal ends, and then interpolate during the time of the lightning signal to determine the phases of the NB transmitters. However, a more reliable and therefore preferred method is described next.

It is an outstanding feature according to the present invention to combine the aforementioned adaptive filtering with a clipping or saturation limiting device 52 upstream of the filters 50, where the device 52 clips or holds the input to the filters at the aforementioned threshold. The processor 26 determines and communicates the threshold to the clipping device 52. This establishes a maximum signal amplitude into the one or more filters 50, which minimizes the ability of the lightning signal K to corrupt the noise signal J. In preferred practice, the clipping device 52 is implemented in software resident in the processor 26.

Figure 29:
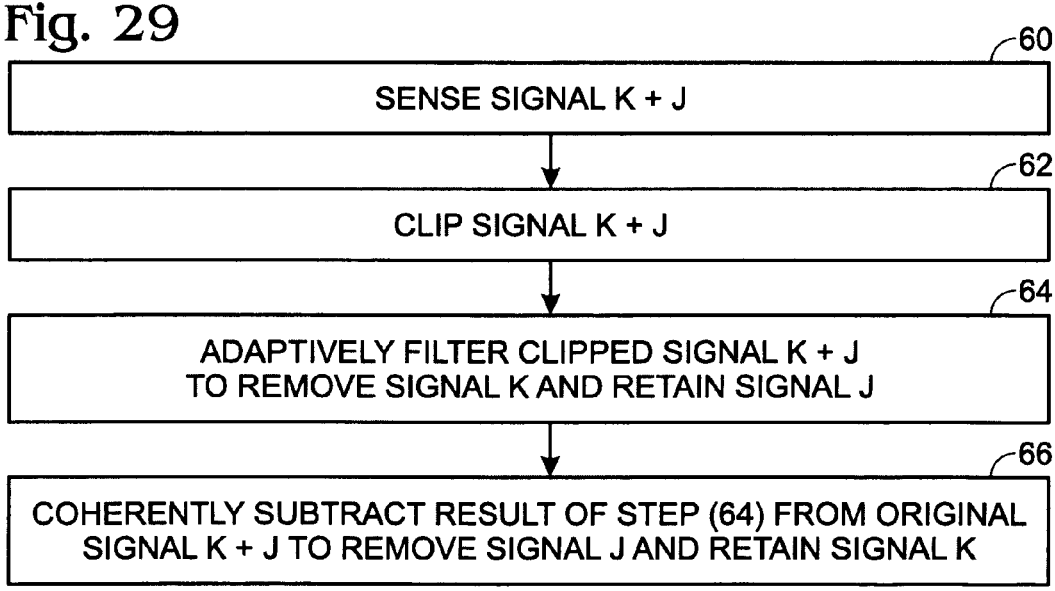
FIG. 29 is a flow chart of a noise mitigation methodology according to the present invention.

To summarize, with reference to FIG. 29, at a step 60, the sensor 14 senses a signal K+J. It is desired to remove the portion K from the signal K+J, and therefore to obtain a clean signal J, by use of adaptive filters 50. For this purpose, at step 62, the input to the filters 50 is clipped to a predetermined maximum amplitude. At step 64, the filters adaptively pass-band filter the clipped input. Finally, at step 66, the processor 26 coherently subtracts the output of the filters from the original signal K+J, leaving behind the desired signal K. The signal K may be utilized for any of the purposes described herein, e.g., estimating the location of the source S (FIG. 1), as well as for other useful purposes as known in the art.

For filtering power line-harmonics, the one or more filters 50 preferably include a "delta-train" filter defined by a transfer function that is a series of impulses at the various harmonics. The separation between the impulses is adaptively changed to follow the center frequency.

Because the power-line noise has an amplitude that is comparable to that of the lightning signal K, it will hamper the ability to only clip the lightning signal. Therefore, the lightning signal should be high-pass filtered prior to being input to the clipping device 52, to remove the power-line noise prior to clipping.

As a preferred alternative, two isolation steps are performed in parallel, a first one of which results in a power-line noise signal (in which NB transmitter noise and most of the lightning signal noise is removed), and a second one which results in the NB transmitter noise signal. The signals resulting from the two isolation steps are then added together and the result coherently subtracted from the original signal K+J.

In the first isolation step the original signal K+J is first low pass filtered and then input to a delta-train filter to produce the power-line noise signal. In the second isolation step the original signal K+J is high-pass filtered prior to being input to the clipping device 52 as described above to produce the NB transmitter noise signal.

The NB signals are typically phase-modulated, so that their band-widths, typically 200 Hz, are not suited to pass-band filtration by a delta-train filter. Accordingly, more generalized filters are used for filtering NB signals.

For NB transmitters, the one or more filters 50 are preferably combined into a single filter with multiple pass-bands, one for each NB signal.

The filtering provided by the one or more filters 50 is preferably applied independently to each channel (E, $M_x$, $M_y$) of the sensor.

The purpose of the one or more filters 50 is to pass the noise; hence the terminology "pass-band filtering." However, it is to be understood that, given a bandwidth X+Y, passing the band X is fully equivalent to rejecting the band Y, and so there is no intention in the use of the term "pass-band filtering" to limit the possibilities of implementing adaptive filters according to the invention.

It should be understood that there is no intention, in the description of a preferred methodology for electrical noise mitigation, that it is always essential to mitigate noise, or to mitigate noise by any particular method to practice the invention, and that where there is sufficient noise to interfere substantially with lightning characterization according to the invention such that noise mitigation is necessary or desirable, any methodology for mitigating the noise, including prior art methodologies, and methodologies yet to be determined, may be employed.

It should also be understood that, while use of the novel arrival angle determination and electrical noise mitigation techniques according to the invention is highly desirable in combination with any of the techniques for characterizing the lightning according to the invention, either technique may be used without the other, either may be used in other contexts, and neither technique is essential to practical realization of characterizing aspects of the invention.

It should also be understood that, in all aspects, the invention may be implemented in either analog or digital circuitry, the latter including general purpose computers and computer systems suitably programmed, and that signals, data, and functions (e.g., amplitude versus time) are considered to be fully equivalent according to the invention. It should likewise be understood that details such as the preferred use of software resident in the processor 26 to implement the filters 50 and clipping device 52 are not important.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for detecting and characterizing a subject lightning strike at a strike location, comprising:

sensing electromagnetic radiation produced by the subject lightning strike at a sensing location and producing a first measured signal representative thereof, said first measured signal defining an amplitude of the subject lighting strike versus time;

establishing a first set of reference data containing reference waveforms comparable to said first measured signal and defining a set of reference amplitudes versus time, said reference waveforms being representative of one or more predetermined reference lightning strikes at various predetermined distances, and where for each of said distances, said reference lightning strikes have associated therewith various predetermined day/night percentages;

comparing, by use of a computer or other suitably adapted electronic device, said first measured signal with said reference data set including finding a correlation between said first measured signal and a correlating waveform in said first set of reference data; and inferring, by reference to said correlating waveform, at least one of a propagation distance, a time-of-arrival, a polarity, and an amplitude of said first measured signal.

2. The method of claim 1, further comprising determining an angle of arrival of said first measured signal at said sensing location, determining a terminator distance from said sensing location to the day/night terminator based on said angle and corresponding to a time associated with the onset of said first measured signal, and selecting from said reference data set reference waveforms for said step of comparing that have day/night propagation characteristics consistent with said terminator distance.

3. The method of claim 2, wherein said correlating waveform has associated therewith a predetermined delay time and propagation distance d, the delay time of said correlating waveform indicating, relative to d/c, the first time the reference amplitude of said correlating waveform reaches either (a) a predetermined first threshold fraction of the maximum reference amplitude, or (b) a zero-crossing after the first time the reference amplitude of said correlating waveform reaches a predetermined second threshold fraction of the maximum reference amplitude, the method further comprising identifying, on said first measured signal, a subject time corresponding to the delay time of said correlating waveform, said subject time representing time-of-day, wherein if the delay time of said correlating waveform represents the first time the reference amplitude of said correlating waveform reaches (a), said subject time indicates the first time the amplitude of said first measured signal, as compared to the maximum amplitude of said first measured signal, reaches said first threshold fraction, and wherein if the delay time of said correlating waveform represents the first time the reference amplitude of said correlating waveform reaches (b), said subject time indicates the nearest zero-crossing of said first measured signal for which the amplitude of the correlating waveform and the amplitude of said first measured signal move in the same direction, wherein said characterizing step includes inferring the time-of-arrival of said first measured signal according to said subject time.

4. The method of claim 3, further comprising producing a second measured signal representative of the subject lightning strike, said first and second measured signals corresponding to two orthogonally oriented spatial components of the electromagnetic radiation, identifying a window of time, obtaining a plurality of samples of the electromagnetic radiation wherein each sample is representative of a pair of the spatial components measured at the same time and wherein different samples correspond to different times within said window, and aggregating data derived from said samples to infer said angle.

5. The method of claim 2, further comprising producing a second measured signal representative of the subject lightning strike, said first and second measured signals corresponding to two orthogonally oriented spatial components of the electromagnetic radiation, identifying a window of time, obtaining a plurality of samples of the electromagnetic radiation wherein each sample is representative of a pair of the spatial components measured at the same time and wherein different samples correspond to different times within said window, and aggregating data derived from said samples to infer said angle.

6. The method of claim 3, further comprising performing a first multi-sensor locating computation for estimating the strike location, said first multi-sensor locating computation utilizing at least one of said propagation distance d, time-of-arrival, amplitude, and angle of said first measured signal along with one or more other indicia of the strike location obtained by sensing the subject lightning strike at other locations remote from said sensing location, computing a revised propagation distance from the strike location to the sensing location based on said first multi-sensor locating computation, associating, by reference to a second set of reference data in accord with said delay time, a revised delay time of said first measured signal with said revised propagation distance, and correcting said time-of-arrival in accord with said revised delay time.

7. The method of claim 6, wherein said step of associating further comprises interpolating said second set of reference data to obtain said revised delay time.

8. The method of claim 7, further comprising performing a second multi-sensor locating computation based on the corrected said time-of-arrival.

9. The method of claim 1, wherein said correlating waveform has associated therewith a predetermined delay time and propagation distance d, the delay time of said correlating waveform indicating, relative to d/c, the first time the reference amplitude of said correlating waveform reaches either (a) a predetermined first threshold fraction of the maximum reference amplitude, or (b) a zero-crossing after the first time the reference amplitude of said correlating waveform reaches a predetermined second threshold fraction of the maximum reference amplitude, the method further comprising identifying, on said first measured signal, a subject time corresponding to the delay time of said correlating waveform, said subject time representing time-of-day, wherein if the delay time of said correlating waveform represents the first time the reference amplitude of said correlating waveform reaches (a), said subject time indicates the first time the amplitude of said first measured signal, as compared to the maximum amplitude of said first measured signal, reaches said first threshold fraction, and wherein if the delay time of said correlating waveform represents the first time the reference amplitude of said correlating waveform reaches (b), said subject time indicates the nearest zero-crossing of said first measured signal for which the amplitude of the correlating waveform and the amplitude of said first measured signal move in the same direction, wherein said characterizing step includes inferring the time-of-arrival of said first measured signal according to said subject time.

10. The method of claim 1, wherein said correlating waveform has associated therewith a predetermined delay time and propagation distance d, the delay time of said correlating waveform indicating, relative to d/c, the first time the reference amplitude of said correlating waveform reaches either (a) a predetermined first threshold fraction of the maximum reference amplitude, or (b) a zero-crossing after the first time the reference amplitude of said correlating waveform reaches a predetermined second threshold fraction of the maximum reference amplitude, the method further comprising identifying, on said first measured signal, a subject time corresponding to the delay time of said correlating waveform, said subject time representing time-of-day, wherein if the delay time of said correlating waveform represents the first time the reference amplitude of said correlating waveform reaches (a), said subject time indicates the first time the amplitude of said first measured signal, as compared to the maximum amplitude of said first measured signal, reaches said first threshold fraction, and wherein if the delay time of said correlating waveform represents the first time the reference amplitude of said correlating waveform reaches (b), said subject time indicates the nearest zero-crossing of said first measured signal for which the amplitude of the correlating waveform and the amplitude of said first measured signal move in the same direction, wherein said characterizing step includes calibrating said first measured signal to speed of light propagation by subtracting the delay time of said correlating waveform from said subject time.

11. The method of claim 1, further comprising identifying an amplitude threshold marking point on said correlating waveform and a corresponding marking point on said measured signal, identifying respective amplitudes corresponding to said marking points, and comparing said respective amplitudes to infer an estimated representative current associated with the lightning strike.

12. The method of claim 11, wherein said correlating waveform has associated therewith a predetermined delay time, the method further comprising finding a correction for correcting said representative current by interpolating from a second set of reference data relating propagation distance and amplitude in accord with at least an indication of said delay time.

13. The method of claim 1, wherein said correlating waveform has associated therewith a reference polarity, the method further comprising inferring the polarity of said measured signal based on said reference polarity.

14. A system for detecting and characterizing a subject lightning strike at a strike location, comprising a remote lightning sensor, said sensor including:
a sensing portion for sensing electromagnetic radiation produced by the subject lightning strike at a sensing location and producing a first measured signal representative thereof, said first measured signal defining an amplitude of the subject lighting strike versus time;
a data bank for establishing a first set of reference data containing reference waveforms comparable to said first measured signal and defining a set of reference amplitudes versus time, said reference waveforms being representative of one or more predetermined reference lightning strikes at various predetermined distances, and where for each of said distances, said reference lightning strikes have associated therewith various predetermined day/night percentages; and
a processor for comparing said first measured signal with said reference data set including finding a correlation between said first measured signal and a correlating waveform in said first set of reference data, and inferring, by reference to said correlating waveform, at least one of a propagation distance, a time-of-arrival, a polarity, and an amplitude of said first measured signal.

15. The system of claim 14, wherein said correlating waveform has associated therewith a predetermined propagation distance d, wherein said processor is adapted to produce an estimate of the strike location based on said angle and said distance d.

16. The system of claim 14, further comprising a clock for measuring time-of-day, wherein said processor is further adapted for determining the angle of arrival of said first measured signal at said sensing location, determining a terminator distance from said sensing location to the day/night terminator based on said angle and corresponding to a time measured by use of said clock that is associated with the onset of said first measured signal, and selecting from said reference data set reference waveforms for said comparing that have day/night propagation characteristics consistent with said terminator distance.

17. The system of claim 16, wherein said correlating waveform has associated therewith a predetermined delay time and propagation distance d, the delay time of said correlating waveform indicating, relative to d/c, the first time the reference amplitude of said correlating waveform reaches either (a) a predetermined first threshold fraction of the maximum reference amplitude, or (b) a zero-crossing after the first time the reference amplitude of said correlating waveform reaches a predetermined second threshold fraction of the maximum reference amplitude, wherein said processor is further adapted for identifying, on said first measured signal, a subject time corresponding to the delay time of said correlating waveform, wherein if the delay time of said correlating waveform represents the first time the reference amplitude of said correlating waveform reaches (a), said subject time indicates the first time the amplitude of said first measured signal, as compared to the maximum amplitude of said first measured signal, reaches said first threshold fraction, and wherein if the delay time of said correlating waveform represents the first time the reference amplitude of said correlating waveform reaches (b), said subject time indicates the nearest zero-crossing of said first measured signal for which the amplitude of the correlating waveform and the amplitude of said first measured signal move in the same direction, and inferring a time-of-arrival of said first measured signal by relating said subject time to time-of-day by use of said clock.

18. The system of claim 17, wherein said sensing portion is further adapted for producing a second measured signal representative of the subject lightning strike, said first and second measured signals corresponding to two orthogonally oriented spatial components of the electromagnetic radiation, and wherein said processor is further adapted for identifying a window of time, obtaining a plurality of samples of the electromagnetic radiation wherein each sample is representative of a pair of the spatial components measured at the same time and wherein different samples correspond to different times within said window, and aggregating data derived from said samples to infer said angle.

19. The system of claim 16, wherein said sensing portion is further adapted for producing a second measured signal representative of the subject lightning strike, said first and second measured signals corresponding to two orthogonally oriented spatial components of the electromagnetic radiation, and wherein said processor is further adapted for identifying a window of time, obtaining a plurality of samples of the electromagnetic radiation wherein each sample is representative of a pair of the spatial components measured at the same time and wherein different samples correspond to different times within said window, and aggregating data derived from said samples to infer said angle.

20. The system of claim 17, further comprising a central analyzer, remote from said sensor, for performing a multi-sensor locating computation for estimating the strike location, said sensor adapted for transmitting at least one of said propagation distance, time-of-arrival, amplitude, and angle of said first measured signal to said central analyzer over a communications channel along with at least an indication of said delay time, said multi-sensor locating computation utilizing at least one of said propagation distance d, time-of-arrival, delay time, amplitude, and angle of said first measured signal along with one or more other indicia of the strike location obtained from other sensors at other locations remote from said sensing location, wherein said central analyzer is adapted for computing a revised propagation distance from the strike location to the sensing location based on said multi-sensor locating computation, associating, by reference to a second set of reference data in accord with said indication, a revised delay time of said first measured signal with said revised propagation distance, and correcting said time-of-arrival in accord with said revised delay time.

21. The system of claim 20, wherein said central analyzer is adapted for interpolating said second set of reference data to obtain said revised delay time.

22. The system of claim 14, further comprising a central analyzer, remote from said sensor, for performing a multi-sensor locating computation for estimating the strike location, said sensor adapted for transmitting at least one of said propagation distance, time-of-arrival, delay time, amplitude, and angle of said first measured signal to said central analyzer over a communications channel, said multi-sensor locating computation utilizing at least one of said propagation distance d, time-of-arrival, delay time, amplitude, and angle of said first measured signal along with one or more other indicia of the strike location obtained from other sensors at other locations remote from said sensing location, wherein said central analyzer is adapted for computing a revised propagation distance from the strike location to the sensing location based on said first multi-sensor locating computation, associating, by interpolating from a second set of reference data, a revised delay time of said first measured signal with said revised propagation distance, and correcting said time-of-arrival in accord with said revised delay time.

23. The system of claim 14, wherein said processor is further adapted for identifying an amplitude threshold marking point on said correlating waveform and a corresponding marking point on said first measured signal, identifying respective amplitudes corresponding to said marking points, and comparing said respective amplitudes to infer an estimated representative current associated with the lightning strike.

24. The system of claim 23, wherein said correlating waveform has associated therewith a predetermined delay time, the system further comprising a central analyzer, remote from said sensor, said sensor adapted for transmitting at least an indication of said delay time to said central analyzer over a communications channel, said central analyzer being adapted for estimating a propagation distance for said first measured signal and finding a correction for correcting said representative amplitude by interpolating from a second set of reference data relating propagation distance and amplitude in accord with at least an indication of said delay time.

25. The system of claim 14, wherein said correlating waveform has associated therewith a reference polarity, wherein said processor is adapted for inferring the polarity of said first measured signal based on said reference polarity.

26. The system of claim 14, wherein said processor is adapted for finding correlating waveforms corresponding, respectively, to positive and negative polarities, wherein said correlating waveforms have associated therewith respective predetermined delay times and propagation distances $d_1$ and $d_2$, the system further comprising a central analyzer, remote from said sensor, said sensor adapted for transmitting at least an indication of the propagation distances $d_1$ and $d_2$ to said central analyzer over a communications channel, said central analyzer being adapted to obtain a first estimate $d_3$ of propagation distance for said first measured signal at said sensor based in part on one or more other indicia of the strike location received from other remote sensors, comparing $d_3$ with $d_1$ and $d_2$, selecting one of said correlating waveforms as being representative of said first measured signal based on said comparison, and utilizing the delay time associated with the selected said correlating waveform to obtain a revised estimate $d_4$ of propagation distance for said first measured signal.

27. The system of claim 26, wherein said central analyzer is adapted for utilizing the delay time associated with the selected said correlating waveform to specify a subset of data from a second set of reference data relating propagation distance and delay, for identifying a corrected delay time associated with said first measured signal.

28. The system of claim 21, wherein said central analyzer is adapted to perform a second multi-sensor locating computation based on the corrected said time-of-arrival.

29. The system of claim 14, wherein said correlating waveform has associated therewith a predetermined delay time and propagation distance d, the delay time of said correlating waveform indicating, relative to d/c, the first time the reference amplitude of said correlating waveform reaches either (a) a predetermined first threshold fraction of the maximum reference amplitude, or (b) a zero-crossing after the first time the reference amplitude of said correlating waveform reaches a predetermined second threshold fraction of the maximum reference amplitude, wherein said processor is further adapted for identifying, on said first measured signal, a subject time corresponding to the delay time of said correlating waveform, said subject time representing time-of-day, wherein if the delay time of said correlating waveform represents the first time the reference amplitude of said correlating waveform reaches (a), said subject time indicates the first time the amplitude of said first measured signal, as compared to the maximum amplitude of said first measured signal, reaches said first threshold fraction, and wherein if the delay time of said correlating waveform represents the first time the reference amplitude of said correlating waveform reaches (b), said subject time indicates the nearest zero-crossing of said first measured signal for which the amplitude of the correlating waveform and the amplitude of said first measured signal move in the same direction, and inferring a time-of-arrival of said first measured signal according to said subject time.

30. The system of claim 14, wherein said correlating waveform has associated therewith a predetermined delay time and propagation distance d, the delay time of said correlating waveform indicating, relative to d/c, the first time the reference amplitude of said correlating waveform reaches either (a) a predetermined first threshold fraction of the maximum reference amplitude, or (b) a zero-crossing after the first time the reference amplitude of said correlating waveform reaches a predetermined second threshold fraction of the maximum reference amplitude, wherein said processor is further adapted for identifying, on said first measured signal, a subject time corresponding to the delay time of said correlating waveform, said subject time representing time-of-day, wherein if the delay time of said correlating waveform represents the first time the reference amplitude of said correlating waveform reaches (a), said subject time indicates the first time the amplitude of said first measured signal, as compared to the maximum amplitude of said first measured signal, reaches said first threshold fraction, and wherein if the delay time of said correlating waveform represents the first time the reference amplitude of said correlating waveform reaches (b), said subject time indicates the nearest zero-crossing of said first measured signal for which the amplitude of the correlating waveform and the amplitude of said first measured signal move in the same direction, and calibrating said first measured signal to speed of light propagation by subtracting the delay time of said correlating waveform from said subject time.

31. The method of claim 1, wherein said correlating waveform has associated therewith a predetermined propagation distance d, the method further comprising producing an estimate of the strike location based on said angle and said distance d.

32. The method of claim 1, further comprising transmitting from the sensing location at least one of said propagation distance, time-of-arrival, delay time, amplitude, and angle of said first measured signal to a central location remote from the sensing location, transmitting one or more other indicia of the strike location obtained at locations remote from the sensing location to the central location, and performing a multi-sensor locating computation for estimating the strike location, said multi-sensor locating computation utilizing at least one of said propagation distance d, time-of-arrival, delay time, amplitude, and angle of said first measured signal along with one or more of said other indicia, computing a revised propagation distance from the strike location to the sensing location based on said first multi-sensor locating computation, associating, by interpolating from a second set of reference data, a revised delay time of said first measured signal with said revised propagation distance, and correcting said time-of-arrival in accord with said revised delay time.

33. The method of claim 14, further comprising finding correlating waveforms corresponding, respectively, to positive and negative polarities, wherein said correlating waveforms have associated therewith respective predetermined delay times and propagation distances $d_1$ and $d_2$, transmitting from the sensing location at least an indication of the propagation distances $d_1$ and $d_2$ to a central location remote from the sensing location, transmitting one or more other indicia of the strike location obtained at locations remote from the sensing location to the central location, obtaining a first estimate $d_3$ of propagation distance for said first measured signal at the sensing location based in part on said other indicia, comparing $d_3$ with $d_1$ and $d_2$, selecting one of said correlating waveforms as being representative of said first measured signal based on said comparison, and utilizing the delay time associated with the selected said correlating waveform to obtain a revised estimate $d_4$ of propagation distance for said first measured signal.

34. The method of claim 33, further comprising utilizing the delay time associated with the selected said correlating waveform to specify a subset of data from a second set of reference data relating propagation distance and delay, and identifying a corrected delay time associated with said first measured signal.

* * * * *